US011867008B2

(12) United States Patent
Mora et al.

(10) Patent No.: US 11,867,008 B2
(45) Date of Patent: Jan. 9, 2024

(54) SYSTEM AND METHODS FOR THE MEASUREMENT OF DRILLING MUD FLOW IN REAL-TIME

(71) Applicant: Saudi Arabian Oil Company, Dhahran (SA)

(72) Inventors: Arturo Magana Mora, Dhahran (SA); Chinthaka Pasan Gooneratne, Dhahran (SA); Michael Affleck, Aberdeenshire (GB); William Contreras Otalvora, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 499 days.

(21) Appl. No.: 17/090,106

(22) Filed: Nov. 5, 2020

(65) Prior Publication Data
US 2022/0136344 A1    May 5, 2022

(51) Int. Cl.
*G06T 7/00*  (2017.01)
*E21B 21/08*  (2006.01)
(Continued)

(52) U.S. Cl.
CPC ............ *E21B 21/08* (2013.01); *E21B 21/065* (2013.01); *G01V 8/00* (2013.01); *G06N 3/04* (2013.01);
(Continued)

(58) Field of Classification Search
CPC ........ G06V 20/52; G06V 20/44; G06V 20/49; G06V 2201/034; G06V 40/10;
(Continued)

(56) References Cited

U.S. PATENT DOCUMENTS

| 891,957 A | 6/1908 | Schubert |
| 2,043,225 A | 6/1936 | Armentrout et al. |

(Continued)

FOREIGN PATENT DOCUMENTS

| AU | 2011282638 B2 * | 7/2015 | ............ E21B 21/08 |
| CA | 1226325 | 9/1987 | |

(Continued)

OTHER PUBLICATIONS

"IADC Dull Grading for PDC Drill Bits," Beste Bit, SPE/IADC 23939, 1992, 52 pages.

(Continued)

*Primary Examiner* — Quan M Hua
(74) *Attorney, Agent, or Firm* — Fish & Richardson P.C.

(57) ABSTRACT

The present disclosure describes methods and systems, including computer-implemented methods, computer program products, and computer systems, for monitoring the flow of drilling mud from a wellbore by image processing. One method includes: capturing, using a digital imaging device, images of drilling mud at a surface of the wellbore as the drilling mud flows through one or more image capture zones of a circulation system that circulates drilling mud through the wellbore and a wellbore drilling assembly; receiving, by one or more processors of a computer system operatively coupled to the digital imaging device, the images captured by the digital imaging device; and processing, by the one or more processors, the images captured by the digital imaging device to determine a rate of flow of the drilling mud through the one or more image capture zones.

18 Claims, 7 Drawing Sheets

(51) Int. Cl.
*E21B 21/06* (2006.01)
*G01V 8/00* (2006.01)
*G06N 3/04* (2023.01)
*G06N 3/08* (2023.01)
*G06T 7/20* (2017.01)
*H04N 7/18* (2006.01)

(52) U.S. Cl.
CPC ............... *G06N 3/08* (2013.01); *G06T 7/20* (2013.01); *H04N 7/183* (2013.01); *E21B 2200/22* (2020.05); *G06T 2207/20081* (2013.01); *G06T 2207/20084* (2013.01); *G06T 2207/30181* (2013.01)

(58) Field of Classification Search
CPC .... G06V 10/764; G06V 10/454; G06V 10/82; G06T 7/0012; G06T 2207/10016; G06T 2207/30004; G06T 2207/20081; G06T 7/20; G06T 2207/20084; G06T 7/62; G06T 17/00; G06T 2207/30104; E21B 21/065; E21B 43/14; E21B 43/12; E21B 2200/22; E21B 21/08; E21B 43/00; E21B 49/005; E21B 2200/20; F04C 2270/041
See application file for complete search history.

(56) References Cited

U.S. PATENT DOCUMENTS

| | | |
|---|---|---|
| 2,110,913 A | 3/1938 | Lowrey |
| 2,227,729 A | 1/1941 | Lynes |
| 2,286,673 A | 6/1942 | Douglas |
| 2,305,062 A | 12/1942 | Church et al. |
| 2,344,120 A | 3/1944 | Baker |
| 2,757,738 A | 9/1948 | Ritchey |
| 2,509,608 A | 5/1950 | Penfield |
| 2,688,369 A | 9/1954 | Broyles |
| 2,690,897 A | 10/1954 | Clark |
| 2,719,363 A | 10/1955 | Richard et al. |
| 2,795,279 A | 6/1957 | Erich |
| 2,799,641 A | 7/1957 | Gordon |
| 2,805,045 A | 9/1957 | Goodwin |
| 2,822,150 A | 2/1958 | Muse et al. |
| 2,841,226 A | 7/1958 | Conrad et al. |
| 2,899,000 A | 8/1959 | Medders et al. |
| 2,927,775 A | 3/1960 | Hildebrandt |
| 2,950,724 A * | 8/1960 | Roederer, Jr. ........... E21B 49/02 134/201 |
| 3,016,244 A | 1/1962 | Friedrich et al. |
| 3,028,915 A | 4/1962 | Jennings |
| 3,087,552 A | 4/1963 | Graham |
| 3,102,599 A | 9/1963 | Hillburn |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,220,478 A | 11/1965 | Kinzbach |
| 3,236,307 A | 2/1966 | Brown |
| 3,253,336 A | 5/1966 | Brown |
| 3,268,003 A | 8/1966 | Essary |
| 3,331,439 A | 7/1967 | Lawrence |
| 3,428,125 A | 2/1969 | Parker |
| 3,468,373 A | 9/1969 | Smith |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,656,564 A | 4/1972 | Brown |
| 3,696,866 A | 10/1972 | Dryden |
| 3,839,791 A | 10/1974 | Feamster |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,064,211 A | 12/1977 | Wood |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,191,493 A | 3/1980 | Hansson et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,334,928 A | 6/1982 | Hara |
| 4,337,653 A | 7/1982 | Chauffe |
| 4,343,651 A | 8/1982 | Yazu et al. |
| 4,354,559 A | 10/1982 | Johnson |
| 4,373,581 A | 2/1983 | Toellner |
| 4,394,170 A | 7/1983 | Sawaoka et al. |
| 4,396,062 A | 8/1983 | Iskander |
| 4,412,585 A | 11/1983 | Bouck |
| 4,413,642 A | 11/1983 | Smith et al. |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,557,327 A | 12/1985 | Kinley et al. |
| 4,576,231 A | 3/1986 | Dowling et al. |
| 4,583,589 A | 4/1986 | Kasevich |
| 4,592,423 A | 6/1986 | Savage et al. |
| 4,610,161 A * | 9/1986 | Gehrig ................. E21B 21/08 175/48 |
| 4,612,988 A | 9/1986 | Segalman |
| 4,620,593 A | 11/1986 | Haagensen |
| 4,636,934 A | 1/1987 | Schwendemann |
| RE32,345 E | 3/1987 | Wood |
| 4,660,636 A | 4/1987 | Rundell et al. |
| 4,705,108 A | 11/1987 | Little et al. |
| 4,708,212 A * | 11/1987 | McAuley ................. E21B 47/11 175/48 |
| 4,817,711 A | 4/1989 | Jearnbey |
| 5,012,863 A | 5/1991 | Springer |
| 5,018,580 A | 5/1991 | Skipper |
| 5,037,704 A | 8/1991 | Nakai et al. |
| 5,055,180 A | 10/1991 | Klaila |
| 5,068,819 A | 11/1991 | Misra et al. |
| 5,070,952 A | 12/1991 | Neff |
| 5,074,355 A | 12/1991 | Lennon |
| 5,082,054 A | 1/1992 | Kiamanesh |
| 5,092,056 A | 3/1992 | Deaton |
| 5,107,705 A | 4/1992 | Wraight et al. |
| 5,107,931 A | 4/1992 | Valka et al. |
| 5,228,518 A | 7/1993 | Wilson et al. |
| 5,236,039 A | 8/1993 | Edelstein et al. |
| 5,278,550 A | 1/1994 | Rhein-Knudsen et al. |
| 5,388,648 A | 2/1995 | Jordan, Jr. |
| 5,490,598 A | 2/1996 | Adams |

(56) References Cited

U.S. PATENT DOCUMENTS

| | | |
|---|---|---|
| 5,501,248 A | 3/1996 | Kiest, Jr. |
| 5,690,826 A | 11/1997 | Cravello |
| 5,803,186 A | 9/1998 | Berger et al. |
| 5,803,666 A | 9/1998 | Keller |
| 5,813,480 A | 9/1998 | Zaleski, Jr. et al. |
| 5,853,049 A | 12/1998 | Keller |
| 5,890,540 A | 4/1999 | Pia et al. |
| 5,899,274 A | 5/1999 | Frauenfeld et al. |
| 5,947,213 A | 9/1999 | Angle |
| 5,955,666 A | 9/1999 | Mullins |
| 5,958,236 A | 9/1999 | Bakula |
| RE36,362 E | 11/1999 | Jackson |
| 5,987,385 A | 11/1999 | Varsamis et al. |
| 6,012,526 A | 1/2000 | Jennings et al. |
| 6,032,742 A | 3/2000 | Tomlin et al. |
| 6,041,860 A | 3/2000 | Nazzal et al. |
| 6,047,239 A | 4/2000 | Berger et al. |
| 6,096,436 A | 8/2000 | Inspektor |
| 6,170,531 B1 | 1/2001 | Jung et al. |
| 6,173,795 B1 | 1/2001 | McGarian et al. |
| 6,189,611 B1 | 2/2001 | Kasevich |
| 6,254,844 B1 | 7/2001 | Takeuchi et al. |
| 6,268,726 B1 | 7/2001 | Prammer |
| 6,269,953 B1 | 8/2001 | Seyffert et al. |
| 6,290,068 B1 | 9/2001 | Adams et al. |
| 6,305,471 B1 | 10/2001 | Milloy |
| 6,325,216 B1 | 12/2001 | Seyffert et al. |
| 6,328,111 B1 | 12/2001 | Bearden et al. |
| 6,330,913 B1 | 12/2001 | Langseth et al. |
| 6,354,371 B1 | 3/2002 | O'Blanc |
| 6,371,302 B1 | 4/2002 | Adams et al. |
| 6,413,399 B1 | 7/2002 | Kasevich |
| 6,443,228 B1 | 9/2002 | Aronstam |
| 6,454,099 B1 | 9/2002 | Adams et al. |
| 6,510,947 B1 | 1/2003 | Schulte et al. |
| 6,534,980 B2 | 2/2003 | Toufaily et al. |
| 6,544,411 B2 | 4/2003 | Varandaraj |
| 6,561,269 B1 | 5/2003 | Brown et al. |
| 6,571,877 B1 | 6/2003 | Van Bilderbeek |
| 6,607,080 B2 | 8/2003 | Winkler et al. |
| 6,612,384 B1 | 9/2003 | Singh et al. |
| 6,622,554 B2 | 9/2003 | Manke et al. |
| 6,623,850 B2 | 9/2003 | Kukino et al. |
| 6,629,610 B1 | 10/2003 | Adams et al. |
| 6,637,092 B1 | 10/2003 | Menzel |
| 6,678,616 B1 | 1/2004 | Winkler et al. |
| 6,722,504 B2 | 4/2004 | Schulte et al. |
| 6,741,000 B2 | 5/2004 | Newcomb |
| 6,761,230 B2 | 7/2004 | Cross et al. |
| 6,814,141 B2 | 11/2004 | Huh et al. |
| 6,827,145 B2 | 12/2004 | Fotland et al. |
| 6,845,818 B2 | 1/2005 | Tutuncu et al. |
| 6,850,068 B2 | 2/2005 | Chernali et al. |
| 6,895,678 B2 | 5/2005 | Ash et al. |
| 6,912,177 B2 | 6/2005 | Smith |
| 6,971,265 B1 | 12/2005 | Sheppard et al. |
| 6,993,432 B2 | 1/2006 | Jenkins et al. |
| 7,000,777 B2 | 2/2006 | Adams et al. |
| 7,013,992 B2 | 3/2006 | Tessari et al. |
| 7,048,051 B2 | 5/2006 | McQueen |
| 7,063,155 B2 | 6/2006 | Ruttley |
| 7,086,463 B2 | 8/2006 | Ringgenberg et al. |
| 7,091,460 B2 | 8/2006 | Kinzer |
| 7,109,457 B2 | 9/2006 | Kinzer |
| 7,115,847 B2 | 10/2006 | Kinzer |
| 7,124,819 B2 | 10/2006 | Ciglenec et al. |
| 7,216,767 B2 | 5/2007 | Schulte et al. |
| 7,255,582 B1 | 8/2007 | Liao |
| 7,312,428 B2 | 12/2007 | Kinzer |
| 7,322,776 B2 | 1/2008 | Webb et al. |
| 7,331,385 B2 | 2/2008 | Symington |
| 7,376,514 B2 | 5/2008 | Habashy et al. |
| 7,387,174 B2 | 6/2008 | Lurie |
| 7,445,041 B2 | 11/2008 | O'Brien |
| 7,455,117 B1 | 11/2008 | Hall et al. |
| 7,461,693 B2 | 12/2008 | Considine et al. |
| 7,484,561 B2 | 2/2009 | Bridges |
| 7,539,548 B2 | 5/2009 | Dhawan |
| 7,562,708 B2 | 7/2009 | Cogliandro et al. |
| 7,629,497 B2 | 12/2009 | Pringle |
| 7,631,691 B2 | 12/2009 | Symington et al. |
| 7,647,980 B2 | 1/2010 | Corre et al. |
| 7,650,269 B2 | 1/2010 | Rodney |
| 7,677,673 B2 | 3/2010 | Tranquilla et al. |
| 7,730,625 B2 | 6/2010 | Blake |
| 7,779,903 B2 | 8/2010 | Bailey et al. |
| 7,951,482 B2 | 5/2011 | Ichinose et al. |
| 7,980,392 B2 | 7/2011 | Varco |
| 8,067,865 B2 | 11/2011 | Savant |
| 8,237,444 B2 | 8/2012 | Simon |
| 8,245,792 B2 | 8/2012 | Trinh et al. |
| 8,275,549 B2 | 9/2012 | Sabag et al. |
| 8,286,734 B2 | 10/2012 | Hannegan et al. |
| 8,484,858 B2 | 7/2013 | Brannigan et al. |
| 8,511,404 B2 | 8/2013 | Rasheed |
| 8,526,171 B2 | 9/2013 | Wu et al. |
| 8,528,668 B2 | 9/2013 | Rasheed |
| 8,567,491 B2 | 10/2013 | Lurie |
| 8,636,063 B2 | 1/2014 | Ravi et al. |
| 8,683,859 B2 | 4/2014 | Godager |
| 8,776,609 B2 | 7/2014 | Dria et al. |
| 8,794,062 B2 | 8/2014 | DiFoggio et al. |
| 8,884,624 B2 | 11/2014 | Homan et al. |
| 8,925,213 B2 | 1/2015 | Sallwasser |
| 8,960,215 B2 | 2/2015 | Cui et al. |
| 8,973,680 B2 | 3/2015 | MacKenzie |
| 9,051,810 B1 | 6/2015 | Cuffe et al. |
| 9,109,429 B2 | 8/2015 | Xu et al. |
| 9,217,323 B2 | 12/2015 | Clark |
| 9,222,350 B2 | 12/2015 | Vaughn et al. |
| 9,238,953 B2 | 1/2016 | Fleming et al. |
| 9,238,961 B2 | 1/2016 | Bedouet |
| 9,250,339 B2 | 2/2016 | Ramirez |
| 9,353,589 B2 | 5/2016 | Hekelaar |
| 9,394,782 B2 | 7/2016 | DiGiovanni et al. |
| 9,435,159 B2 | 9/2016 | Scott |
| 9,464,487 B1 | 10/2016 | Zurn |
| 9,470,059 B2 | 10/2016 | Zhou |
| 9,494,010 B2 | 11/2016 | Flores |
| 9,494,032 B2 | 11/2016 | Roberson et al. |
| 9,528,366 B2 | 12/2016 | Selman et al. |
| 9,562,987 B2 | 2/2017 | Guner et al. |
| 9,617,815 B2 | 4/2017 | Schwartze et al. |
| 9,664,011 B2 | 5/2017 | Kruspe et al. |
| 9,702,211 B2 | 7/2017 | Tinnen |
| 9,731,471 B2 | 8/2017 | Schaedler et al. |
| 9,739,141 B2 | 8/2017 | Zeng et al. |
| 9,757,796 B2 | 9/2017 | Sherman et al. |
| 9,845,653 B2 | 12/2017 | Hannegan et al. |
| 9,903,010 B2 | 2/2018 | Doud et al. |
| 9,976,381 B2 | 5/2018 | Martin et al. |
| 10,000,983 B2 | 6/2018 | Jackson et al. |
| 10,113,408 B2 | 10/2018 | Pobedinski et al. |
| 10,174,577 B2 | 1/2019 | Leuchtenberg et al. |
| 10,233,372 B2 | 3/2019 | Ramasamy et al. |
| 10,329,877 B2 | 6/2019 | Simpson et al. |
| 10,352,125 B2 | 7/2019 | Frazier |
| 10,392,910 B2 | 8/2019 | Walton et al. |
| 10,394,193 B2 | 8/2019 | Li et al. |
| 10,544,640 B2 | 1/2020 | Hekelaar |
| 10,551,800 B2 | 2/2020 | Li et al. |
| 10,673,238 B2 | 6/2020 | Boone et al. |
| 2002/0066563 A1 | 6/2002 | Langseth et al. |
| 2002/0074269 A1* | 6/2002 | Hensley ............ E21B 21/065 209/729 |
| 2002/0120401 A1* | 8/2002 | Macdonald ........ E21B 44/005 702/6 |
| 2003/0159776 A1 | 8/2003 | Graham |
| 2003/0230526 A1 | 12/2003 | Okabayshi et al. |
| 2004/0182574 A1 | 9/2004 | Sarmad et al. |
| 2004/0256103 A1 | 12/2004 | Batarseh |
| 2005/0022987 A1 | 2/2005 | Green et al. |
| 2005/0092523 A1 | 5/2005 | McCaskill et al. |
| 2005/0259512 A1 | 11/2005 | Mandal |

(56) References Cited

U.S. PATENT DOCUMENTS

| | | |
|---|---|---|
| 2006/0011520 A1* | 1/2006 | Schulte ............ B01D 33/033 209/309 |
| 2006/0016592 A1 | 1/2006 | Wu |
| 2006/0106541 A1 | 5/2006 | Hassan et al. |
| 2006/0144620 A1 | 7/2006 | Cooper |
| 2006/0185843 A1 | 8/2006 | Smith |
| 2006/0248949 A1 | 11/2006 | Gregory et al. |
| 2006/0249307 A1 | 11/2006 | Ritter |
| 2007/0131591 A1 | 6/2007 | Pringle |
| 2007/0137852 A1 | 6/2007 | Considine et al. |
| 2007/0175633 A1 | 8/2007 | Kosmala |
| 2007/0187089 A1 | 8/2007 | Bridges |
| 2007/0204994 A1 | 9/2007 | Wimmersperg |
| 2007/0289736 A1 | 12/2007 | Kearl et al. |
| 2008/0007421 A1 | 1/2008 | Liu et al. |
| 2008/0047337 A1 | 2/2008 | Chemali et al. |
| 2008/0053652 A1 | 3/2008 | Corre et al. |
| 2008/0173480 A1 | 7/2008 | Annaiyappa et al. |
| 2008/0190822 A1 | 8/2008 | Young |
| 2008/0308282 A1 | 12/2008 | Standridge et al. |
| 2009/0153354 A1 | 6/2009 | Daussin |
| 2009/0164125 A1 | 6/2009 | Bordakov et al. |
| 2009/0178809 A1 | 7/2009 | Jeffryes et al. |
| 2009/0259446 A1 | 10/2009 | Zhang et al. |
| 2010/0006339 A1 | 1/2010 | Desai |
| 2010/0089583 A1 | 4/2010 | Xu et al. |
| 2010/0276209 A1 | 11/2010 | Yong et al. |
| 2010/0282511 A1 | 11/2010 | Maranuk |
| 2011/0011576 A1 | 1/2011 | Cavender et al. |
| 2011/0120732 A1 | 5/2011 | Lurie |
| 2011/0155368 A1 | 6/2011 | El-Khazindar |
| 2012/0012319 A1 | 1/2012 | Dennis |
| 2012/0111578 A1 | 5/2012 | Tverlid |
| 2012/0132418 A1 | 5/2012 | McClung |
| 2012/0152543 A1 | 6/2012 | Davis |
| 2012/0173196 A1 | 7/2012 | Miszewski |
| 2012/0186817 A1 | 7/2012 | Gibson et al. |
| 2012/0222854 A1 | 9/2012 | McClung, III |
| 2012/0227983 A1 | 9/2012 | Lymberopoulous et al. |
| 2012/0273187 A1 | 11/2012 | Hall |
| 2012/0325564 A1 | 12/2012 | Vaughn et al. |
| 2013/0008653 A1 | 1/2013 | Schultz et al. |
| 2013/0008671 A1 | 1/2013 | Booth |
| 2013/0025943 A1 | 1/2013 | Kumar |
| 2013/0068525 A1 | 3/2013 | Digiovanni |
| 2013/0076525 A1 | 3/2013 | Vu et al. |
| 2013/0125642 A1 | 5/2013 | Parfitt |
| 2013/0126164 A1 | 5/2013 | Sweatman et al. |
| 2013/0146359 A1 | 6/2013 | Koederitz |
| 2013/0213637 A1 | 8/2013 | Kearl |
| 2013/0255936 A1 | 10/2013 | Statoilydro et al. |
| 2013/0269945 A1 | 10/2013 | Mulholland et al. |
| 2013/0308424 A1 | 11/2013 | Kumar |
| 2014/0083771 A1 | 3/2014 | Clark |
| 2014/0132468 A1 | 5/2014 | Scott et al. |
| 2014/0183143 A1 | 7/2014 | Cady et al. |
| 2014/0231075 A1 | 8/2014 | Springett et al. |
| 2014/0231147 A1 | 8/2014 | Bozso et al. |
| 2014/0238658 A1 | 8/2014 | Wilson et al. |
| 2014/0246235 A1 | 9/2014 | Yao |
| 2014/0251894 A1 | 9/2014 | Larson et al. |
| 2014/0265337 A1 | 9/2014 | Harding et al. |
| 2014/0278111 A1 | 9/2014 | Gerrie et al. |
| 2014/0291023 A1 | 10/2014 | Edbury |
| 2014/0300895 A1 | 10/2014 | Pope et al. |
| 2014/0326506 A1 | 11/2014 | Difoggio |
| 2014/0333754 A1 | 11/2014 | Graves et al. |
| 2014/0360778 A1 | 12/2014 | Batarseh |
| 2014/0375468 A1 | 12/2014 | Wilkinson et al. |
| 2015/0020908 A1 | 1/2015 | Warren |
| 2015/0021240 A1 | 1/2015 | Wardell et al. |
| 2015/0027724 A1 | 1/2015 | Symms |
| 2015/0083422 A1 | 3/2015 | Pritchard |
| 2015/0091737 A1 | 4/2015 | Richardson et al. |
| 2015/0101864 A1 | 4/2015 | May |
| 2015/0129306 A1 | 5/2015 | Coffman et al. |
| 2015/0159467 A1 | 6/2015 | Hartman et al. |
| 2015/0211362 A1 | 7/2015 | Rogers |
| 2015/0267500 A1 | 9/2015 | Van Dongen |
| 2015/0290878 A1 | 10/2015 | Houben et al. |
| 2015/0300151 A1 | 10/2015 | Mohaghegh |
| 2016/0053572 A1 | 2/2016 | Snoswell |
| 2016/0053604 A1 | 2/2016 | Abbassian |
| 2016/0076357 A1 | 3/2016 | Hbaieb |
| 2016/0115783 A1 | 4/2016 | Zeng et al. |
| 2016/0130928 A1 | 5/2016 | Torrione et al. |
| 2016/0153240 A1 | 6/2016 | Braga et al. |
| 2016/0160106 A1 | 6/2016 | Jamison et al. |
| 2016/0237810 A1 | 8/2016 | Beaman et al. |
| 2016/0247316 A1 | 8/2016 | Whalley et al. |
| 2016/0356125 A1 | 12/2016 | Bello et al. |
| 2017/0051785 A1 | 2/2017 | Cooper |
| 2017/0056929 A1* | 3/2017 | Torrione ............ E21B 21/065 |
| 2017/0077705 A1 | 3/2017 | Kuttel et al. |
| 2017/0161885 A1 | 6/2017 | Parmeshwar et al. |
| 2017/0234104 A1 | 8/2017 | James |
| 2017/0292376 A1 | 10/2017 | Kumar et al. |
| 2017/0314335 A1 | 11/2017 | Kosonde et al. |
| 2017/0328196 A1 | 11/2017 | Shi et al. |
| 2017/0328197 A1 | 11/2017 | Shi et al. |
| 2017/0332482 A1 | 11/2017 | Hauslmann |
| 2017/0342776 A1 | 11/2017 | Bullock et al. |
| 2017/0350201 A1 | 12/2017 | Shi et al. |
| 2017/0350241 A1 | 12/2017 | Shi |
| 2018/0010030 A1 | 1/2018 | Ramasamy et al. |
| 2018/0010419 A1 | 1/2018 | Livescu et al. |
| 2018/0171772 A1 | 6/2018 | Rodney |
| 2018/0171774 A1 | 6/2018 | Ringer et al. |
| 2018/0177064 A1 | 6/2018 | Van Pol et al. |
| 2018/0187498 A1 | 7/2018 | Soto et al. |
| 2018/0265416 A1 | 9/2018 | Ishida et al. |
| 2018/0326679 A1 | 11/2018 | Weisenberg et al. |
| 2018/0334883 A1 | 11/2018 | Williamson |
| 2018/0363404 A1 | 12/2018 | Faugstad |
| 2019/0049054 A1 | 2/2019 | Gunnarsson et al. |
| 2019/0101872 A1 | 4/2019 | Li |
| 2019/0227499 A1 | 7/2019 | Li et al. |
| 2019/0257180 A1 | 8/2019 | Kriesels et al. |
| 2019/0267805 A1 | 8/2019 | Kothuru et al. |
| 2020/0032638 A1 | 1/2020 | Ezzeddine |
| 2020/0125040 A1 | 4/2020 | Li et al. |
| 2020/0248546 A1 | 8/2020 | Torrione et al. |
| 2020/0370381 A1 | 11/2020 | Al-Rubaii et al. |
| 2020/0371495 A1 | 11/2020 | Al-Rubaii et al. |

FOREIGN PATENT DOCUMENTS

| | | | |
|---|---|---|---|
| CA | 2249432 | 9/2005 | |
| CA | 2537585 | 8/2006 | |
| CA | 2669721 | 7/2011 | |
| CA | 2594042 | 8/2012 | |
| CN | 200989202 | 12/2007 | |
| CN | 203232293 | 10/2013 | |
| CN | 204627586 | 9/2015 | |
| CN | 107462222 | 12/2017 | |
| CN | 110571475 | 12/2019 | |
| DE | 102008001607 | 11/2009 | |
| DE | 102012022453 | 5/2014 | |
| DE | 102013200450 | 7/2014 | |
| DE | 102012205757 | 8/2014 | |
| EP | 2317068 | 5/2011 | |
| EP | 2574722 | 4/2013 | |
| EP | 2737173 | 6/2014 | |
| EP | 3279430 A1 * | 2/2018 | ............ E21B 21/08 |
| GB | 2124855 | 2/1984 | |
| GB | 2357305 | 6/2001 | |
| GB | 2399515 | 9/2004 | |
| GB | 2422125 | 7/2006 | |
| GB | 2532967 | 6/2016 | |
| JP | 2009067609 | 4/2009 | |
| JP | 4275896 | 6/2009 | |
| JP | 5013156 | 8/2012 | |
| JP | 2013110910 | 6/2013 | |
| NO | 343139 | 11/2018 | |

(56) References Cited

FOREIGN PATENT DOCUMENTS

| NO | 20161842 | 5/2019 |
|---|---|---|
| RU | 2282708 | 8/2006 |
| RU | 122531 | 11/2012 |
| WO | WO 1995035429 | 12/1995 |
| WO | WO 1997021904 | 6/1997 |
| WO | WO 2000025942 | 5/2000 |
| WO | WO 2000031374 | 6/2000 |
| WO | WO 2001042622 | 6/2001 |
| WO | WO 2002020944 | 3/2002 |
| WO | WO 2002068793 | 9/2002 |
| WO | WO 2004042185 | 5/2004 |
| WO | WO 2007049026 | 5/2007 |
| WO | WO 2007070305 | 6/2007 |
| WO | WO 2008146017 | 12/2008 |
| WO | WO 2009020889 | 2/2009 |
| WO | WO 2009113895 | 9/2009 |
| WO | WO 2010054353 | 5/2010 |
| WO | WO 2010105177 | 9/2010 |
| WO | WO 2011038170 | 3/2011 |
| WO | WO 2011042622 | 6/2011 |
| WO | WO 2011130159 | 10/2011 |
| WO | WO 2011139697 | 11/2011 |
| WO | WO 2012007407 | 1/2012 |
| WO | WO 2013016095 | 1/2013 |
| WO | WO 2013148510 | 10/2013 |
| WO | WO 2014127035 | 8/2014 |
| WO | WO 2015072971 | 5/2015 |
| WO | WO 2015095155 | 6/2015 |
| WO | WO 2016007139 | 1/2016 |
| WO | WO 2016077521 | 5/2016 |
| WO | WO 2016178005 | 11/2016 |
| WO | WO 2017011078 | 1/2017 |
| WO | WO 2017027105 | 2/2017 |
| WO | WO 2017132297 | 8/2017 |
| WO | WO 2017196303 | 11/2017 |
| WO | WO 2018022198 | 2/2018 |
| WO | WO 2018169991 | 9/2018 |
| WO | WO 2019040091 | 2/2019 |
| WO | WO 2019055240 | 3/2019 |
| WO | WO 2019089926 | 5/2019 |
| WO | WO 2019108931 | 6/2019 |
| WO | WO 2019169067 | 9/2019 |
| WO | WO 2019236288 | 12/2019 |
| WO | WO 2019246263 | 12/2019 |

OTHER PUBLICATIONS

AkerSolutions, "Aker MH CCTC Improving Safety," AkerSolutions, Jan. 2008, 12 pages.
Anwar et al., "Fog computing: an overview of big IoT data analytics," ID 7157192, Wiley, Hindawi, Wireless communications and mobile computing, May 2018, 2018: 1-22, 23 pages.
Artymiuk et al., "The new drilling control and monitoring system," Acta Montanistica Slovaca, Sep. 2004, 9:3 (145-151), 7 pages.
Ashby et al., "Coiled Tubing Conveyed Video Camera and Multi-Arm Caliper Liner Damage Diagnostics Post Plug and Perf Frac," SPE-172622-MS, Society of Petroleum Engineers (SPE), presented at the SPE Middle East Oil & Gas Show and Conference, Mar. 8-11, 2015, 12 pages.
Bilal et al., "Potentials, trends, and prospects in edge technologies: Fog, cloudlet, mobile edge, and micro data centers," Computer Networks, Elsevier, Oct. 2017, 130: 94-120, 27 pages.
Carpenter, "Advancing Deepwater Kick Detection," JPT, 68:5, May 2016, 2 pages.
Commer et al., "New advances in three-dimensional controlled-source electromagnetic inversion," Geophys. J. Int., 2008, 172: 513-535, 23 pages.
Corona et al., "Novel Washpipe-Free ICD Completion With Dissolvable Material," OTC-28863-MS, presented at the Offshore Technology Conference, Houston, TX, Apr. 30-May 3, 2018, 2018, OTC, 10 pages.
Dickens et al., "An LED array-based light induced fluorescence sensor for real-time process and field monitoring," Sensors and Actuators B: Chemical, Elsevier, Apr. 2011, 158:1 (35-42), 8 pages.
Dong et al., "Dual Substitution and Spark Plasma Sintering to Improve Ionic Conductivity of Garnet Li7La3Zr2O12," Nanomaterials, 9:721, 2019, 10 pages.
downholediagnostic.com [online] "Acoustic Fluid Level Surveys," retrieved from URL <https://www.downholediagnostic.com/fluid-level> retrieved on Mar. 27, 2020, available on or before 2018, 13 pages.
edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.
Fjetland et al., "Kick Detection and Influx Size Estimation during Offshore Drilling Operations using Deep Learning," INSPEC 18992956, IEEE, presented at the 2019 14th IEEE Conference on Industrial Electronics and Applications (ICIEA), Jun. 19-21, 2019, 6 pages.
Gemmeke and Ruiter, "3D ultrasound computer tomography for medical imagining," Nuclear Instruments and Methods in Physics Research Section A:580 (1057-1065), Oct. 1, 2007, 9 pages.
gryphonoilfield.com [online], "Gryphon Oilfield Services, Echo Dissolvable Fracturing Plug," available on or before Jun. 17, 2020, retrieved on Aug. 20, 2020, retrieved from URL <https://www.gryphonoilfield.com/wp-content/uploads/2018/09/Echo-Series-Dissolvable-Fracturing-Plugs-8-23-2018-1.pdf>, 1 page.
Halliburton, "Drill Bits and Services Solutions Catalogs," retrieved from URL: <https://www.halliburton.com/content/dam/ps/public/sdbs/sdbs_contents/Books_and_Catalogs/web/DBS-Solution.pdf> on Sep. 26, 2019, 2014, 64 pages.
Hopkin, "Factor Affecting Cuttings Removal during Rotary Drilling," Journal of Petroleum Technology 19.06, Jun. 1967, 8 pages.
Ji et al., "Submicron Sized Nb Doped Lithium Garnet for High Ionic Conductivity Solid Electrolyte and Performance of All Solid-State Lithium Battery," doi:10.20944/preprints201912.0307.v1, Dec. 2019, 10 pages.
Johnson et al., "Advanced Deepwater Kick Detection," IADC/SPE 167990, presented at the 2014 IADC/SPE Drilling Conference and Exhibition, Mar. 4-6, 2014, 10 pages.
Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.
King et al., "Atomic layer deposition of TiO2 films on particles in a fluidized bed reactor," Power Technology, 183:3, Apr. 2008, 8 pages.
Lafond et al., "Automated Influx and Loss Detection System Based on Advanced Mud Flow Modeling," SPE-195835-MS, Society of Petroleum Engineers (SPE), presented at the SPE Annual Technical Conference and Exhibition, Sep. 30-Oct. 2, 2019, 11 pages.
Li et al., 3D Printed Hybrid Electrodes for Lithium-ion Batteries, Missouri University of Science and Technology, Washington State University; ECS Transactions, 77 (11) 1209-1218 (2017), 11 pages.
Liu et al., "Flow visualization and measurement in flow field of a torque converter," Mechanic automation and control Engineering, Second International Conference on IEEE, Jul. 15, 2011, 1329-1331.
Liu et al., "Superstrong micro-grained polycrystalline diamond compact through work hardening under high pressure," Appl. Phys. Lett. Feb. 2018, 112: 6 pages.
Luo et al., "Simple Charts to Determine Hole Cleaning Requirements in Deviated Wells," IADC/SPE 27486, SPE/IADC Drilling Conference, Society of Petroleum Engineers, Feb. 15-18, 1994, 7 pages.
Maurer, "The Perfect Cleaning Theory of Rotary Drilling," Journal of Petroleum Technology 14.11, 1962, 5 pages.
nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.
Nuth, "Smart oil field distributed computing," The Industrial Ethernet Book, Nov. 2014, 85:14 (1-3), 3 pages.

(56) References Cited

OTHER PUBLICATIONS

Olver, "Compact Antenna Test Ranges," Seventh International Conference on Antennas and Propagation IEEE, Apr. 15-18, 1991, 10 pages.
Paiaman et al., "Effect of Drilling Fluid Properties on Rate Penetration," Nafta 60:3, 2009, 6 pages.
Parini et al., "Chapter 3: Antenna measurements," in Theory and Practice of Modern Antenna Range Measurements, IET editorial, 2014, 30 pages.
petrowiki.org [online], "Hole Cleaning," retrieved from URL <http://petrowiki.org/Hole_cleaning#Annular-fluid_velocity>, retrieved on Jan. 25, 2019, 8 pages.
petrowiki.org [online], "Kicks," Petrowiki, available on or before Jun. 26, 2015, retrieved on Jan. 24, 2018, retrieved from URL <https://petrowiki.org/Kicks>, 6 pages.
Ranjbar, "Cutting Transport in Inclined and Horizontal Wellbore," University of Stavanger, Faculty of Science and Technology, Master's Thesis, Jul. 6, 2010, 137 pages.
Rasi, "Hole Cleaning in Large, High-Angle Wellbores," IADC/SPE 27464, Society of Petroleum Engineers (SPE), presented at the 1994 SPE/IADC Drilling Conference, Feb. 15-18, 1994, 12 pages.
rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.
Robinson and Morgan, "Effect of Hole Cleaning on Drilling Rate Performance," Paper Aade-04-Df-Ho-42, AADE 2004 Drilling Fluids Conference, Houston, Texas, Apr. 6-7, 2004, 7 pages.
Robinson, "Economic Consequences of Poor Solids and Control," AADE 2006 Fluids Conference and Houston, Texas, Apr. 11-12, 2006, 9 pages.
Rubaii et al., "A new robust approach for hole cleaning to improve rate of penetration," SPE 192223-MS, Society of Petroleum Engineers (SPE), presented at the SPE Kingdom of Saudi Arabia Annual Technical Symposium and Exhibition, Apr. 23-26, 2018, 40 pages.
Ruiter et al., "3D ultrasound computer tomography of the breast: A new era?" European Journal of Radiology 81S1, Sep. 2012, 2 pages.
sageoiltools.com [online] "Fluid Level & Dynamometer Instruments for Analysis due Optimization of Oil and Gas Wells," retrieved from URL <http://www.sageoiltools.com/>, retrieved on Mar. 27, 2020, available on or before 2019, 3 pages.
Schlumberger, "CERTIS: Retrievable, single-trip, production-level isolation system," www.slb.com/CERTIS, 2017, 2 pages.
Schlumberger, "First Rigless ESP Retrieval and Replacement with Slickline, Offshore Congo: Zeitecs Shuttle System Eliminates Need to Mobilize a Workover Rig," slb.com/zeitecs, 2016, 1 page.
Schlumberger, "The Lifting Business," Offshore Engineer, Mar. 2017, 1 page.
Schlumberger, "Zeitecs Shuttle System Decreases ESP Replacement Time by 87%: Customer ESP riglessly retrieved in less than 2 days on coiled tubing." slb.com/zeitecs, 2015, 1 page.
Schlumberger, "Zeitecs Shuttle System Reduces Deferred Production Even Before ESP is Commissioned, Offshore Africa: Third Party ESP developed fault during installation and was retrieved on rods, enabling operator to continue running tubing without waiting on replacement," slb.com/zeitecs, 2016, 2 pages.
Schlumberger, "Zeitecs Shuttle: Rigless ESP replacement system," Schlumberger, 2017, 2 pages.
Sifferman et al., "Drilling cutting transport in full scale vertical annuli," Journal of Petroleum Technology 26.11, 48th Annual Fall Meeting of the Society of Petroleum Engineers of AIME, Las Vegas, Sep. 30-Oct. 3, 1973, 12 pages.
slb.com [online] "Technical Paper: ESP Retrievable Technology: A Solution to Enhance ESP Production While Minimizing Costs," SPE 156189 presented in 2012, retrieved from URL <http://www.slb.com/resources/technical_papers/artificial_lift/156189.aspx>, retrieved on Nov. 2, 2018, 1 pages.
slb.com [online], "Zeitecs Shuttle Rigless ESP Replacement System," retrieved from URL <http://www.slb.com/services/production/artificial_lift/submersible/zeitecs-shuttle.aspx?t=3>, available on or before May 31, 2017, retrieved on Nov. 2, 2018, 3 pages.
Sulzer Metco, "An Introduction to Thermal Spray," 4, 2013, 24 pages.
Takahashi et al., "Degradation study on materials for dissolvable frac plugs," URTeC 2901283, presented at the Unconventional Resources Technology Conference, Houston, Texas, Jul. 23-25, 2018, 9 pages.
tervesinc.com [online], "Tervalloy™ Degradable Magnesium Alloys," available on or before Jun. 12, 2016, via Internet Archive: Wayback Machine URL <https://web.archive.org/web/20160612114602/http://tervesinc.com/media/Terves 8-Pg_Brochure.pd>, retrieved on Aug. 20, 2020, <http://tervesinc.com/media/Terves_8-Pg_Brochure.pdf>, 8 pages.
Tobenna, "Hole Cleaning Hydraulics," Universitetet o Stavanger, Faculty of Science and Technology, Master's Thesis, Jun. 15, 2010, 75 pages.
Wastu et al., "The effect of drilling mud on hole cleaning in oil and gas industry," Journal of Physics: Conference Series, Dec. 2019, 1402:2, 7 pages.
Weatherford, "RFID Advanced Reservoir Management System Optimizes Injection Well Design, Improves Reservoir Management," Weatherford.com, 2013, 2 pages.
Wei et al., "The Fabrication of All-Solid-State Lithium-Ion Batteries via Spark Plasma Sintering," Metals, 7: 372, 2017, 9 pages.
Wellbore Service Tools: Retrievable tools, "RTTS Packer," Halliburton: Completion Tools, 2017, 4 pages.
wikipedia.org [online] "Optical Flowmeters," retrieved from URL <https://en.wikipedia.org/wiki/Flow_measurement#Optical_flowmeters>, retrieved on Mar. 27, 2020, available on or before Jan. 2020, 1 page.
wikipedia.org [online] "Ultrasonic Flow Meter," retrieved from URL <https://en.wikipedia.org/wiki/Ultrasonic_flow_meter>, retrieved on Mar. 27, 2020, available on or before Sep. 2019, 3 pages.
wikipedia.org [online], "Surface roughness," retrieved from URL <https://en.wikipedia.org/wiki/Surface_roughness>, retrieved on Apr. 2, 2020, available on or before Oct. 2017, 6 pages.
Williams and Bruce, "Carrying Capacity of Drilling Muds," Journal of Petroleum Technology, 3.04, 192, 1951, 10 pages.
Xia et al., "A Cutting Concentration Model of a Vertical Wellbore Annulus in Deep-water Drilling Operation and its Application," Applied Mechanics and Materials, 101-102, Sep. 27, 2011, 5 pages.
Xue et al., "Spark plasma sintering plus heat-treatment of Ta-doped Li7La3Zr2O12 solid electrolyte and its ionic conductivity," Mater. Res. Express 7 (2020) 025518, 8 pages.
Zhan et al. "Effect of β-to-α Phase Transformation on the Microstructural Development and Mechanical Properties of Fine-Grained Silicon Carbide Ceramics," Journal of the American Ceramic Society 84.5, May 2001, 6 pages.
Zhan et al. "Single-wall carbon nanotubes as attractive toughening agents in alumina-based nanocomposites," Nature Materials 2.1, Jan. 2003, 6 pages.
Zhan et al., "Atomic Layer Deposition on Bulk Quantities of Surfactant Modified Single-Walled Carbon Nanotubes," Journal of American Ceramic Society, 91:3, Mar. 2008, 5 pages.
Zhang et al., "Increasing Polypropylene High Temperature Stability by Blending Polypropylene-Bonded Hindered Phenol Antioxidant," Macromolecules, 51:5 (1927-1936), 2018, 10 pages.
Zhu et al., "Spark Plasma Sintering of Lithium Aluminum Germanium Phosphate Solid Electrolyte and its Electrochemical Properties," University of British Columbia; Nanomaterials, 9, 1086, 2019, 10 pages.
PCT International Search Report and Written Opinion in International Appln. No. PCT/US2021/058034, dated Feb. 18, 2022, 13 pages.

\* cited by examiner

SYSTEM AND METHODS FOR THE MEASUREMENT OF DRILLING MUD FLOW IN REAL-TIME

TECHNICAL FIELD

This disclosure relates to wellbores, particularly, to drilling wellbores.

BACKGROUND

Hydrocarbons trapped in subsurface reservoirs can be raised to the surface of the Earth through wellbores formed from the surface to the subsurface reservoirs. Wellbore drilling systems are used to drill wellbores through a subterranean zone (for example, a formation, a portion of a formation, or multiple formations) to the subsurface reservoir. At a basic level, the wellbore drilling system includes a drill bit connected to an end of a drill string. The drill string is rotated and weight is applied to the drill bit to drill through the subterranean zone. Wellbore drilling fluid (also known as drilling mud) is flowed in a downhole direction through the drill string. The drilling mud exits the drill bit through ports defined in the drill bit and flows in an uphole direction through an annulus defined by an outer surface of the drill string and an inner wall of the wellbore. As the drilling mud flows towards the surface, it carries cuttings and debris released into the wellbore due to the drilling. The cuttings and debris are generally released from the subterranean zone as the drill bit breaks rock while penetrating the subterranean zone. When mixed with the drilling mud, the cuttings and debris form a solid slurry that can flow to the surface. At the surface, the cuttings and debris can be filtered from the solid slurry and the drilling mud can be recirculated into the wellbore to continue drilling.

SUMMARY

This specification describes technologies for monitoring the flow of drilling mud from a wellbore by image processing.

According to a first aspect, a method for monitoring the flow of drilling mud from a wellbore includes: capturing, using a digital imaging device, images of drilling mud at a surface of the wellbore as the drilling mud flows through one or more image capture zones of a circulation system that circulates drilling mud through the wellbore and a wellbore drilling assembly; receiving, by one or more processors of a computer system operatively coupled to the digital imaging device, the images captured by the digital imaging device; and processing, by the one or more processors, the images captured by the digital imaging device to determine a rate of flow of the drilling mud through the one or more image capture zones.

In some cases, the method also includes: receiving a mud flow-in rate from a flow rate sensor of the circulation system; calculating a delta flow based on a difference between the mud flow-in rate and the rate of flow of the drilling mud through the one or more image capture zones; and displaying, using a display device of the computer system, a mud flow status based on the delta flow. The method may also include identifying one or more recommended actions for operating the wellbore drilling assembly based on the delta flow or the mud flow status; and displaying the one or more recommended actions on the display device.

In some implementations of the method, the one or more image capture zones include a discharge zone where a flow-out line connects to a possum belly, the possum belly being configured to receive drilling mud from the flow-out line.

In some implementations, the circulation system includes one or more shaker assemblies, each including a splash zone configured to receive drilling mud from the possum belly, wherein the one or more image capture zones include the splash zone of each of the one or more shaker assemblies.

In some implementations, the method also includes determining a partial flow rate of drilling mud through the splash zone of each of a plurality of shaker assemblies; and combining the partial flow rates to obtain the rate of flow of the drilling mud.

In some implementations, implementing image processing techniques includes deploying a machine learning model to extract abstract features from the images captured by the digital imaging device. In some cases, the machine learning model includes a convolutional neural network (CNN) model, the method further including: receiving additional features that include one or more of drilling parameters of the wellbore drilling assembly, properties of the drilling mud, and the weight of drilling mud measured in the one or more image capture zones using one or more mass sensors; concatenating the abstract features extracted by the CNN and the additional features; and feeding the concatenated features as input to a regression model to determine the rate of flow of the drilling mud through the one or more image capture zones.

According to a second aspect, a system for monitoring the flow of drilling mud from a wellbore, includes: a digital imaging device configured to capture images of drilling mud at a surface of the wellbore as the drilling mud flows through one or more image capture zones of a circulation system configured to circulate drilling mud through the wellbore and a wellbore drilling assembly; a computer system operatively coupled to the digital imaging device, the computer system including one or more processors and a computer-readable medium storing instructions executable by the one or more processors to perform operations including: receiving the images captured by the digital imaging device; and processing, by the one or more processors, the images captured by the digital imaging device to determine a rate of flow of the drilling mud through the one or more image capture zones.

Some implementations of the system include a flow rate sensor configured to measure a mud flow-in rate of the drilling mud through the wellbore drilling assembly and into the wellbore, wherein the computer system includes a display device and is configured to perform operations including: receiving the mud flow-in rate from the flow rate sensor; calculating a delta flow based on a difference between the mud flow-in rate and the rate of flow of the drilling mud through the one or more image capture zones; identifying a mud flow status based on the delta flow; identifying one or more recommended actions for operating the wellbore drilling assembly based on the delta flow or the mud flow status; and displaying the mud flow status and the one or more recommended actions on the display device.

Some implementations of the system include a possum belly configured to receive drilling mud from a flow-out line of the circulation system, wherein the one or more image capture zones include a discharge zone where the flow-out line connects to the possum belly. In some cases, the digital imaging device includes a camera mounted to or adjacent to the possum belly and oriented to face the discharge zone of the possum belly.

Some implementations of the system include one or more shaker assemblies, wherein each of the one or more shaker assemblies includes a splash zone configured to receive drilling mud from the possum belly, wherein the one or more image capture zones include the splash zone of each of the one or more shaker assemblies. In some cases, each of the one or more shaker assemblies includes a flow pane with an adjustable opening through which drilling mud flows from the possum belly into the splash zone, wherein the one or more image capture zones include the flow pane of each of the one or more shaker assemblies. The digital imaging device may include a camera mounted to or adjacent to each of the one or more shaker assemblies, wherein each camera is oriented to face the splash zone and flow pane of the one or more shaker assemblies. The digital imaging device may also include a camera mounted above and oriented to face the possum belly and the one or more shaker assemblies, wherein the camera includes a field of view that includes the discharge zone of the possum belly and the splash zone of each of the one or more shaker assemblies.

In some implementations, the computer system is configured to perform operations including: deploying a convolutional neural network (CNN) model to extract abstract features from the images captured by the digital imaging device; receiving additional features that include one or more of drilling parameters of the wellbore drilling assembly, properties of the drilling mud, and the weight of drilling mud measured in the one or more image capture zones using one or more mass sensors; concatenating the abstract features extracted by the CNN and the additional features; and feeding the concatenated features as input to a regression model to determine the rate of flow of the drilling mud through the one or more image capture zones.

Other implementations include corresponding computer programs recorded on one or more computer storage devices, each configured to perform the actions of the methods.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Wellbore drilling involves breaking rock in a subterranean zone to form and deepen a wellbore. The broken rock is carried to the wellbore surface by drilling mud that flows through the wellbore.

This disclosure relates to systems and techniques that can be implemented to monitor the flow of drilling mud at the wellbore surface. A digital imaging device along with data analytics models can be implemented to estimate, in real-time, the rate of mud flow that exits the wellbore at the wellbore surface. Potential hazards can be identified and assessed. The monitoring can reduce or eliminate the need for manual, visual inspection of mud flow. The monitoring system can alert the rig crew about possible drilling hazards in real-time and, in some implementations, predict, mitigate, or even prevent major challenges to wellbore operations.

Figure 1:
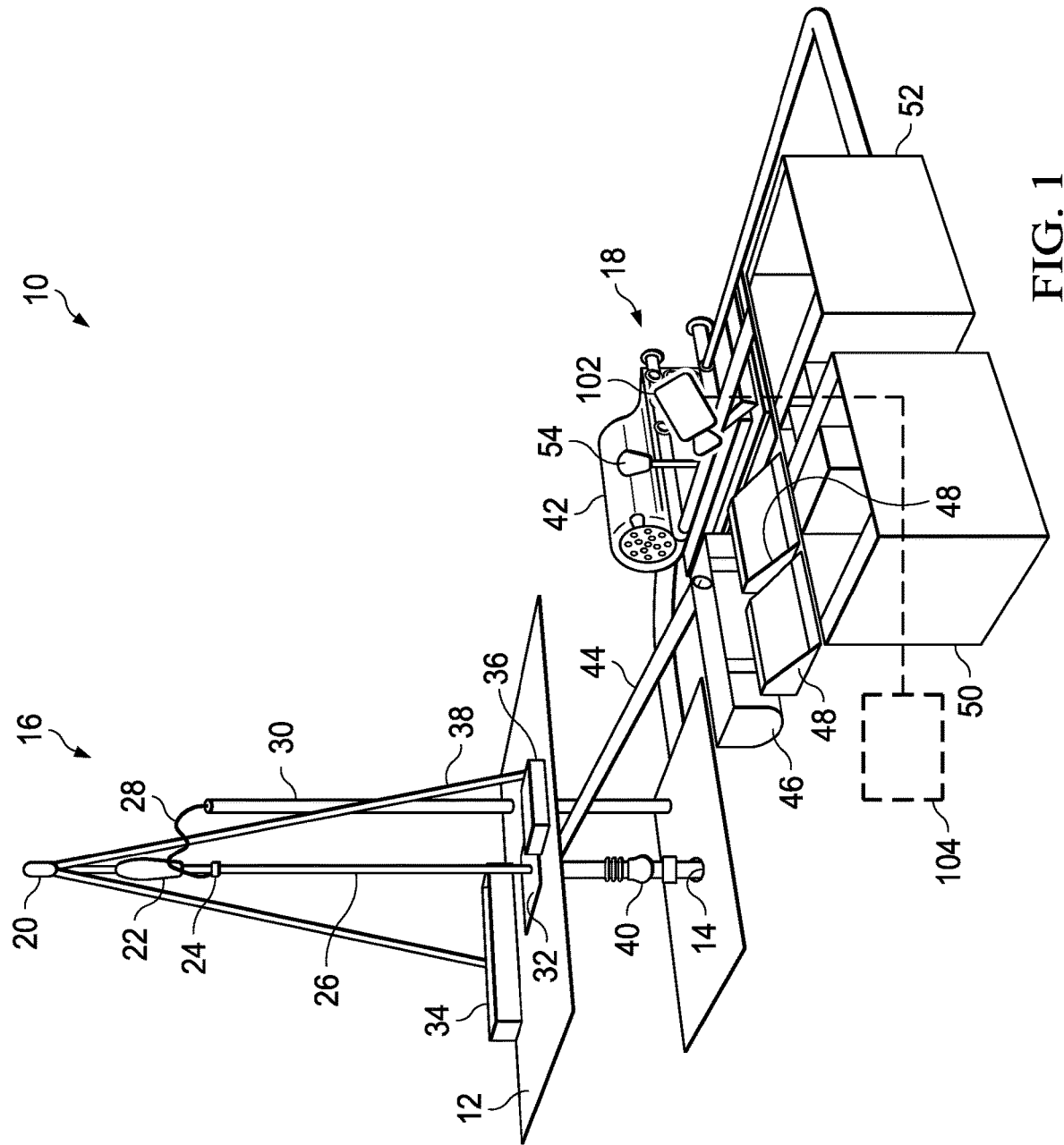
FIG. 1 is a schematic diagram of a wellbore drilling assembly for drilling a wellbore.

FIG. 1 is a schematic diagram of a wellbore drilling assembly 10 and a system for monitoring the flow of drilling mud from the wellbore. The wellbore can extend from the surface through the Earth to one or more subterranean zones of interest. The wellbore drilling assembly 10 includes a drill floor 12 positioned above the surface, a wellhead assembly 14, a drill string assembly 16 supported by a rig structure, a fluid circulation system 18 to filter used drilling fluid or drilling mud from the wellbore and provide clean drilling mud to the drill string assembly 16. The wellhead assembly 14 can be used to support casing or other wellbore components or equipment into the wellbore.

A derrick or mast is a support framework mounted on the drill floor 12 and positioned over the wellbore to support the components of the drill string assembly 16 during drilling operations. A crown block 20 forms a longitudinally-fixed top of the derrick and connects to a travelling block 22 with a drilling line that includes a set of wire ropes or cables. The crown block 20 and the travelling block 22 support the drill string assembly 16 via a swivel 24, a kelly 26. Longitudinal movement of the travelling block 22 relative to the crown block 20 of the drill string assembly 16 moves the drill string assembly 16 longitudinally upward and downward. The swivel 24, connected to and hung by the travelling block 22 and a rotary hook, allows free rotation of the drill string assembly 16 and provides a connection to a kelly hose 28. The kelly hose 28 flows drilling mud from a drilling mud supply of the circulation system 18 to the drill string assembly 16. A standpipe 30 mounted on the drill floor 12 guides at least a portion of the kelly hose 28 to a location proximate to the drill string assembly 16. The kelly 26 is generally a device with a hexagonal cross-section suspended from the swivel 24 and connected to a longitudinal top of the drill string assembly 16. Kelly 26 turns with the drill string assembly 16 as a rotary table 32 of the drill string assembly turns. The techniques described in this disclosure can be implemented with a top drive system instead of the kelly 26.

In the wellbore drilling assembly 10 of FIG. 1, the drill string assembly 16 is made up of drill pipes with a drill bit (not shown) at a longitudinally bottom end of the drill string. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 16. In some implementations, the kelly 26 and swivel 24 can be replaced by a top drive that allows the drill string assembly 16 to spin and drill. The wellhead assembly 14 can also include a drawworks 34 and a deadline anchor 36. A drawworks 34 includes a winch that acts as a hoisting system to reel the drilling line in and out to raise and lower the drill string assembly 16 by a fast line. A deadline anchor 36 fixes the drilling line opposite the drawworks 34 by a deadline 38 and can measure the suspended load (or hook load) on the rotary hook. The weight on bit (WOB) can be measured when the drill bit is at the bottom the wellbore.

The illustrated wellhead assembly 14 also includes a blowout preventer 40 positioned at the surface of the wellbore and below (but often connected to) the drill floor 12. The blowout preventer 40 prevents wellbore blowouts caused by formation fluid entering the wellbore, displacing drilling mud, and flowing to the surface at a pressure greater than atmospheric pressure. The blowout preventer 40 can close around (and in some instances, through) the drill string assembly 16 and seal off the space between the drill string and the wellbore wall. Wellhead assemblies can take a variety of forms and include a number of different components.

During a drilling operation, the circulation system 18 circulates drilling mud from the wellbore to the drill string assembly 16, filters used drilling mud from the wellbore, and provides clean drilling mud to the drill string assembly 16. The illustrated circulation system 18 includes a fluid pump 42 that fluidly connects to and provides drilling mud to drill string assembly 16 via the kelly hose 28 and the standpipe 30. The circulation system 18 also includes a flow-out line 44, a possum belly or header box 46, two shale shakers 48, a settling pit 50, and a suction pit 52. In a drilling operation, the circulation system 18 pumps drilling mud from the surface, through the drill string assembly 16, out the drill bit and back up the annulus of the wellbore, where the annulus is the space between the drill pipe and the formation or casing. The hydrostatic pressure from the drilling mud is intended to be greater than the formation pressures to prevent formation fluids from entering the annulus and flowing to the surface, but less than the mechanical strength of the formation since a higher pressure may fracture the formation and create a path for the drilling muds to enter the formation. Apart from wellbore control, drilling mud can also cool the drill bit and lift rock cuttings from the drilled formation up the annulus and to the surface to be filtered out and treated. The drilling mud returns from the annulus with rock cuttings and flows out to the flow-out line 44, which connects to and provides the fluid to the shaker header box or possum belly 46. The flow-out line 44 is an inclined pipe that directs the drilling mud from the annulus to the possum belly 46. The possum belly 46 is connected to and distributes drilling mud to the shale shakers 48. Each shale shaker 48 includes a mesh-like surface to separate the coarse rock cuttings from the drilling mud. Finer rock cuttings and drilling mud then go through the settling pit 50 to the suction pit 50. The circulation system 18 includes a mud hopper 54 into which materials (for example, to provide dispersion, rapid hydration, and uniform mixing) can be introduced to the circulation system 18. The fluid pump 42 cycles the drilling mud up the standpipe 30 through the swivel 24 and back into the drill string assembly 16 to return to the wellbore.

A system for monitoring the flow of drilling mud from the wellbore includes a digital image capturing device 102 and an onsite computer system 104 to monitor the drilling mud that flows from within the wellbore to the surface in real time. The digital imaging device 102 and the computer system 104 together form a monitoring system that can track the flow of drilling mud as it emerges from the wellbore and passes through the possum belly 46 and the shale shakers 48.

In some implementations, the digital imaging device 102 (for example, a smart camera, an image sensor, vision sensor network or similar digital imaging device) can capture digital images of the mud flow. The computer system 104 can receive the images, process the images using image processing techniques to analyze the received images, and determine a volumetric rate of flow of the drilling mud at the wellbore surface. For example, the digital imaging device 102 can be configured to capture images of drilling mud as it flows through one or more image capture zones of the circulation system 18. The image capture zones can include regions of the possum belly 46, the shale shakers 48, or both. The computer system 104 can use image processing techniques based, e.g., semantic and instance segmentation, or based on machine learning (ML) or deep learning (DL) to extract abstract features from the images and estimate the flow rate of mud through each of the image capture zones, as described in more detail later. Such an estimation of the drilling mud flow rate has several applications including, for example, the identification of an influx of drilling mud, a loss of drilling mud circulation, and the identification and analysis of chemical treatments, such as sweep pills, to name a few.

Figure 2:
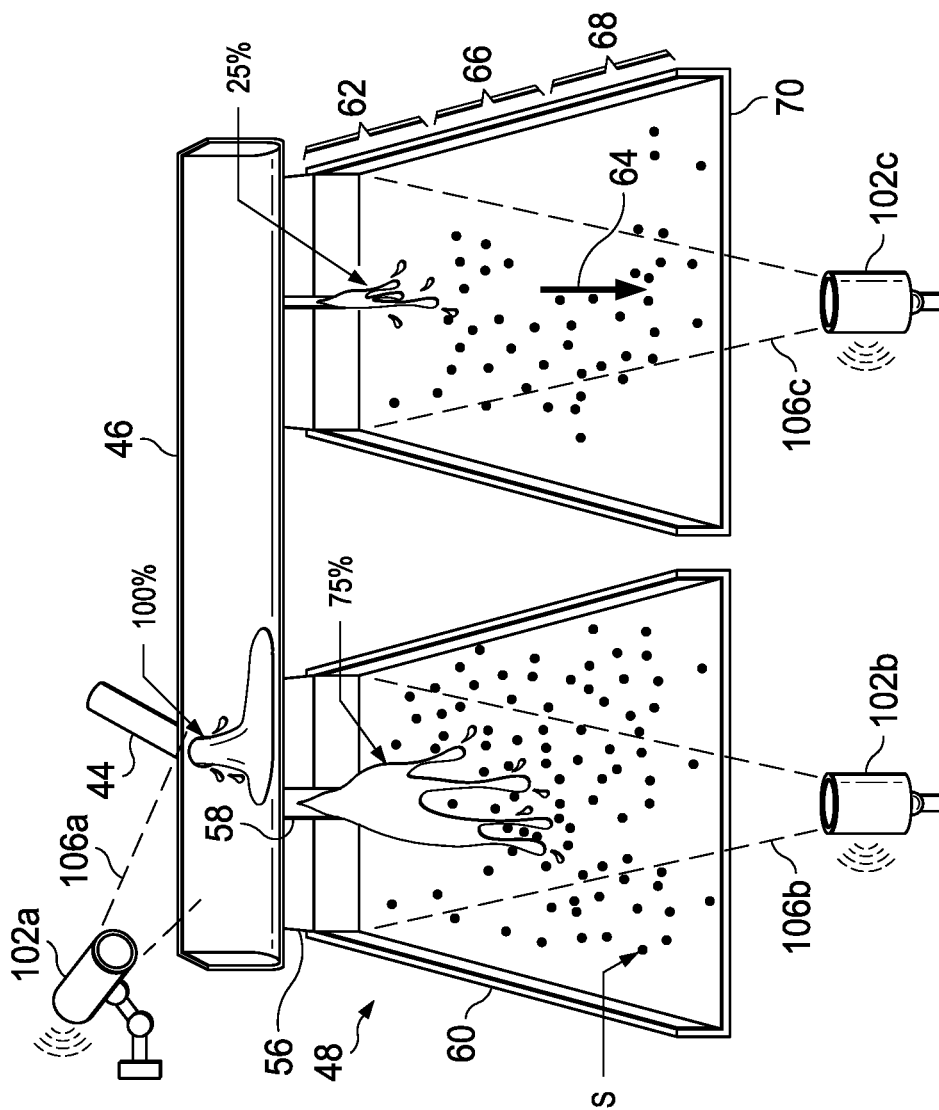
FIG. 2 is a schematic diagram of a system for monitoring the flow of drilling mud from the wellbore according to an implementation.

FIG. 2 is an enlarged schematic view of the possum belly 46, the shale shakers 48, the digital imaging device 102, and the computer system 104. The possum belly 46 is connected to the flow-out line 44 and receives drilling mud from the wellbore. During drilling operation, the drilling mud can include drill cuttings and other solids S dispersed in the liquid phase. Flow-out line 44 opens into the possum belly 46 at a discharge zone for the drilling mud (and any drilling solids). For example, the drilling mud can gain momentum as it flows along the inclined flow-out line 44 and slows as it flows into the discharge zone and the possum belly. In FIG. 2, the flow of drilling mud is represented by droplets. Possum belly 46 can also be referred to as a "header box," a "distribution box," or a "flow line trap." In some implementations, the possum belly 46 includes a mass sensor (not shown) that measures the weight of the drilling mud that flows into the possum belly 46.

Downstream from the discharge zone and the flow-out line 44, the possum belly 46 is connected to two shale shakers 48 that filter solids dispersed in the drilling mud before the drilling mud is pumped back into the drilling assembly. A flow pane 56 with an adjustable opening 58 is arranged between each shale shaker 48 and the possum belly 46. In a system that includes multiple shale shakers 48, the size of the respective flow pane openings 58 can be adjusted to distribute the drilling mud according to a specific ratio. For example, in FIG. 2, the flow pane openings 58 are configured so that 75% of the drilling mud from the possum belly 46 flows to the shale shaker 48 on the left and 25% of the drilling mud flows to the shale shaker 48 on the right. Although the implementation of FIG. 2 includes two shale shakers 48, some implementations may include only a single shale shaker 48 or more than two shale shakers 48, e.g., three to eight shale shakers. Further, although the shale shakers 48 in FIG. 2 are each connected to the possum belly 46 by a flow pane 56, other implementations do not necessarily include a flow pane 56. For example, the shale shaker 48 can be positioned below the possum belly 46 so that drilling mud flows over the edge of the possum belly 46 and into the shale shaker 48 below.

The drilling mud lands on a shaking screen and is carried downstream of the shale shaker 48 when the shaking screen is vibrated by shaker basket motors (not shown). FIG. 2 shows different length segments of the moving tray 60 or the mesh or sieve of the shale shaker 48. In particular, the length segment nearest the possum belly 46 and the flow pane 56 can be a very wet or splash zone 62 in which the drilling mud is wettest, that is, it has the highest concentration of drilling mud among all the length segments. In some implementations, the shale shaker 48 includes a mass sensor (not shown) that is arranged below the splash zone 62 and weighs the drilling mud and solids that flow onto the screen. Arrow 64 represents a direction of movement of the drilling mud as the shaking screen vibrates. The length segment downstream of the very wet or splash zone 62 is an intermediate zone 66 that is drier compared to the very wet or splash zone 62 because at least some but not all of the drilling mud has been drained from the drilling mud. The length segment downstream of the intermediate zone 66 is the dry zone 68 in which the drilling mud is most dry, that is, has the lowest concentration of drilling mud among all the length segments. The dry zone 68 can be the length segment that is immediately upstream of a downstream edge 70 of the tray 60. In the dry zone 68, most, if not all, of the drilling mud liquid has been drained from the slurry leaving only solid objects or mostly solid objects with very little drilling mud. The solid objects from which the drilling mud has been separated are discarded in a solids discard zone (not shown) downstream of the shale shaker's edge 70. The drilling mud and any fine solids, depending on the mesh size of the shale shaker screen, are gathered into a sump tank for further treatment and recycling for reuse in the wellbore drilling operation. In some implementations, the relative sizes of the splash zone 62, the intermediate zone 66, and the dry zone 68 can differ from what is shown in FIG. 2.

As illustrated, the digital imaging device 102 can include a plurality of cameras 102a, 102b, 102c that are oriented such that the view finder or screen of each device 102a-102c faces the drilling mud. In particular, a first camera 102a is oriented such that the field of view of the camera captures a plan view of the opening of the flow-out line 44 into the possum belly. The second and third cameras 102b, 102c are each oriented such that their fields of view capture a plan view of the flow pane opening 58 and the very wet or splash zone 62 of the shaker screen, respectively. Thus, the discharge zone in the possum belly 46, the flow pane openings 58, and splash zones 62 form image capture zones in which images of the flowing drilling mud are captured by the cameras 102a-102c of the digital imaging device 102. Each camera 102a-102c can have a field of view 106a-106c that spans an entire width of the shaking screen or possum belly so as to image an entirety of the drilling mud carried by the shaking screen and possum belly, respectively. The cameras 102a-102c can include smart, waterproof, high resolution, wireless cameras or any other image or vision sensor such as infrared sensors, gamma ray sensors, computerized tomography (CT) scanners, thermal sensors, or X-ray sensors, to name a few. The fields of view of cameras 102a-102c can be illuminated with lights to account for low light conditions. Alternatively, cameras 102a-102c can include night vision capabilities.

In FIG. 2, each camera 102a-102c is mounted to a stand (not shown) that is positioned adjacent to the possum belly 46 or the downstream edge 70 of the shale shakers 48. However, the cameras 102a-102c can also be mounted to the possum belly 46 or the shale shakers 48 themselves. For example, the shale shakers 48 include a static motor cable support member (for example, a swing arm or other static, non-vibrating member) that spans a width of the shaking screen and that carries cabling or wiring to power the motors. In some implementations, the cameras 102b, 102c are mounted on and directly attached to the support member. Alternatively or in addition, the digital imaging device 102 can be mounted on other components of the circulation system 18, for example, a centrifuge, de-sander, or de-silter.

Although FIG. 2 illustrates an implementation in which the digital imaging device 102 includes a camera for each image capture zone, this is not necessarily the case. For example, the digital imaging device 102 can include a single device or camera mounted elsewhere on the drilling rig site, for example, on a pole installed onto the drilling rig structure or onto or into the ground around the rig structure that effectively hoists the digital imaging device 102 to a bird's eye view above the solids control equipment. In such implementations, the camera's field of view can cover multiple or even all image capture zones (e.g. the discharge zone and numerous splash zones). The images captured by the single device can be cropped to obtain individual frames for each zone prior to image processing. In yet another implementation, the digital imaging device 102 can include devices that are provided for a single image capture zone and other devices that capture more than one image capture zone.

In any case, the digital imaging device 102 is mounted to a component that does not vibrate extensively during operation so that the digital imaging device 102 can capture relatively vibration-free images. In some implementations, vibration dampeners can be mounted to a component and the digital imaging device 102 can be mounted to any component whose vibrations have been dampened. In some implementations, the digital imaging device 102 can implement vibration control or shake reduction features to capture nearly vibration-free or shake-free images even if mounted on a vibrating structure of a wellbore drilling assembly component. In some implementations, vibration dampeners can be mounted to a component and shake reduction features can be implemented in the digital imaging device 102. In some implementations, image distortions due to vibration or shaking can be removed during image processing.

The digital imaging device 102 is operatively coupled to the computer system 104, for example, by wired or wireless operative coupling techniques. The computer system 104 includes a computer-readable medium (for example, a transitory or a non-transitory computer-readable medium) and one or more processors coupled to the computer-readable medium. The computer-readable medium stores computer instructions executable by the one or more processors to perform operations described in this disclosure. In some implementations, the computer system 104 can implement edge or fog computing hardware and software based on artificial intelligence models including ML and DL for image or video processing. Together, the digital imaging device 102 and the computer system 104 can form an Internet of Things (IoT) platform to be used on a drilling rig and configured to implement a set of artificial intelligence models including ML and DL that serve as the foundation for enabling analysis of new sensors and data streams in real-time to provide advanced solutions for optimization of drilling operations.

Figure 3:
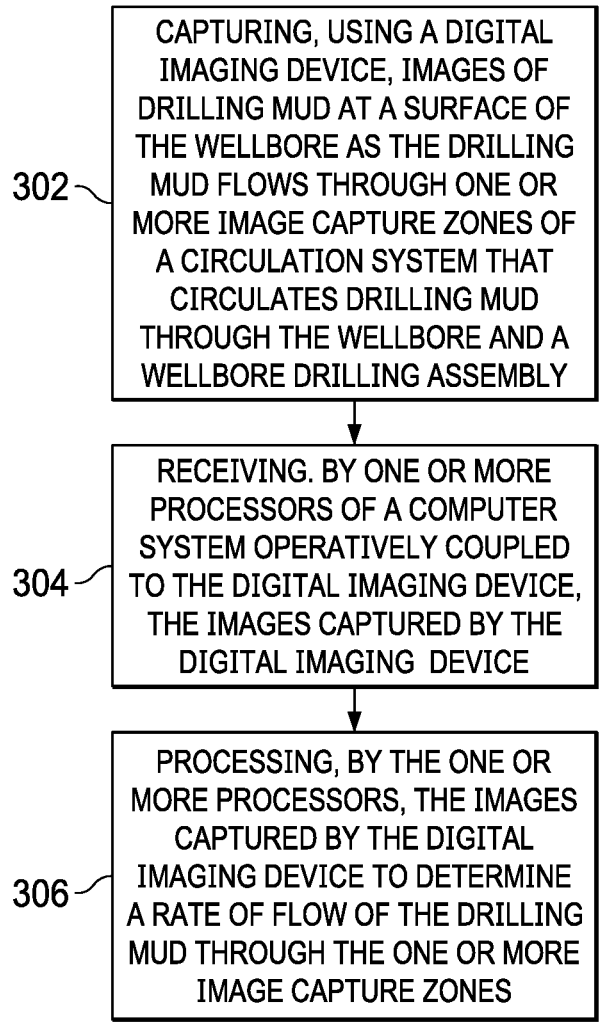
FIG. 3 is a flowchart of an example of a process for monitoring the flow of drilling mud from a wellbore.

FIG. 3 is a flowchart of an example of a process 300 for monitoring the flow of drilling mud from a wellbore. At 302, images of drilling mud at a surface of the wellbore are captured using a digital imaging device 102 as the drilling mud flows through one or more image capture zones of a circulation system that circulates drilling mud through the wellbore and a wellbore drilling assembly. At 304, the images captured by the digital imaging device are received by one or more processors of a computer system operatively coupled to the digital imaging device. At 306, image processing techniques are implemented on the captured images by the one or more processors of the computer system to determine a rate of flow of the drilling mud through the one or more image capture zones. As described previously, the one or more image capture zones can include the discharge zone of the possum belly 46. Additionally or alternatively, the one or more image capture zones can include the splash zone 62 of one or more shale shakers 48. If the shale shakers 48 are connected to the possum belly 46 by a flow pane 56, the image capture zones can also include the flow pane opening 58 for each shale shaker 48.

In some implementations, a machine learning model extracts at 306 abstract features from the images captured by the digital imaging device. For example, the machine learning model can include a convolutional neural network (CNN) model. The image processing techniques can include receiving additional features besides the captured images; extracting abstract features from the images captured by the digital imaging device using the CNN; concatenating the abstract features extracted by the CNN and the additional features; and feeding the concatenated features as input to a regression model to determine the rate of flow of the drilling mud through the one or more image capture zones. In some implementations, these additional features can include drilling parameters of the wellbore drilling assembly, properties of the drilling mud, and the weight of drilling mud measured in the one or more image capture zones using one or more mass sensors, to name a few examples.

Figure 4:
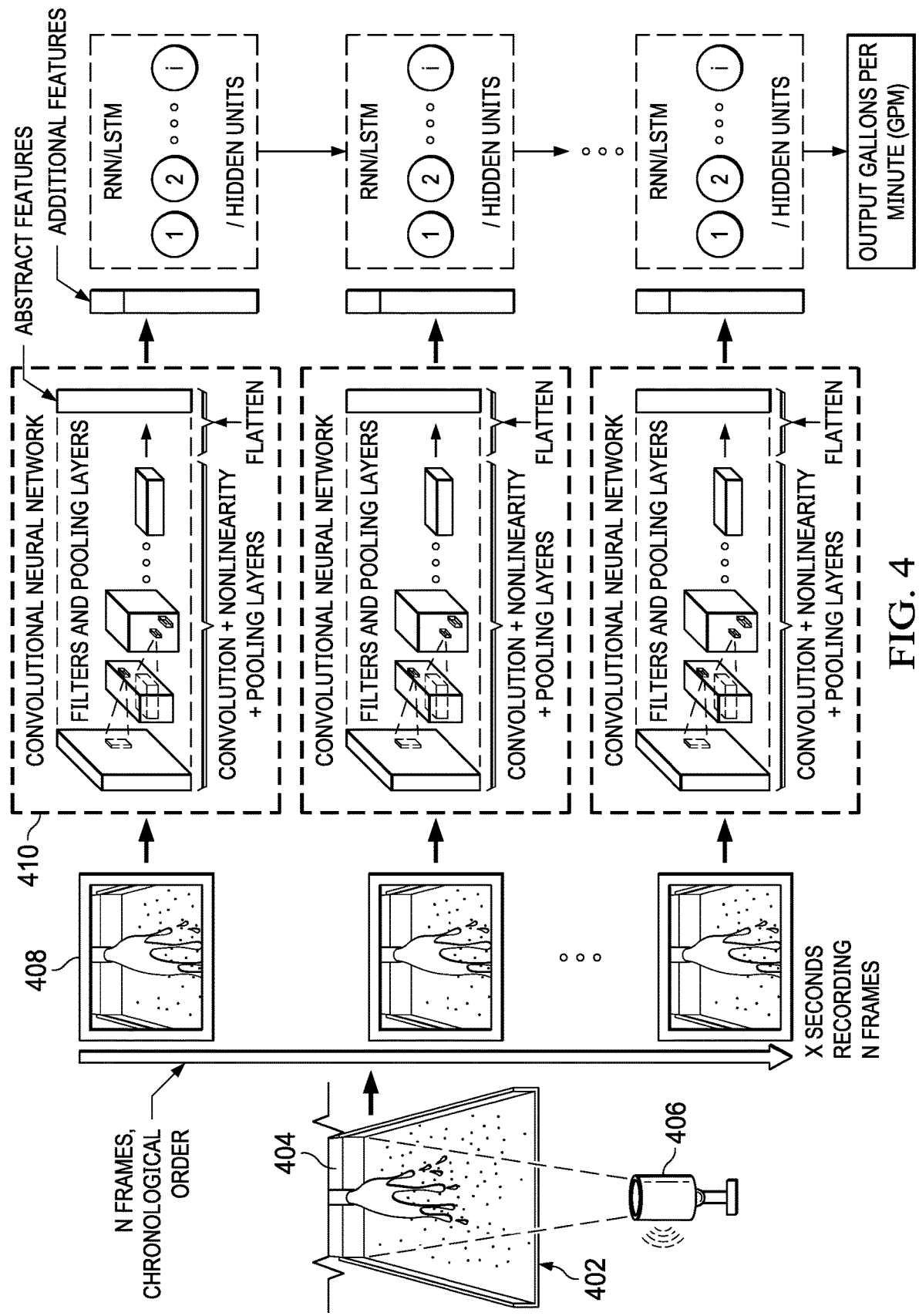
FIG. 4 is a schematic diagram of an example of how the computer system predicts mud flow at a shale shaker using image processing techniques.

FIG. 4 is a schematic diagram of how the mud flow at a shale shaker 402 is predicted using image processing techniques according to one implementation. The shale shaker 402 may be similar to the shale shakers 48 shown in FIG. 2. As in other implementations, the shale shaker 402 includes a flow pane 404 that regulates the flow of drilling mud from the possum belly (not shown) onto the screen of the shale shaker 402. As described earlier, a digital imaging device 406 (for example a camera) captures multiple images of the shale shaker 402 and the flow pane 404 as drilling mud (represented by black droplets) flows through the flow pane opening and along the splash zone of the shale shaker 402 and transmits the images to the computer system. In some cases, the series of images may be individual frames of a video. In other cases, the images may captured in snapshot mode.

A generic CNN model 410 implemented by the computer system is also shown. A CNN is a suitable DL model for pattern recognition and image classification and can exploit spatial correlation/dependencies in the data. The size and number of filter and pooling layers in different CNNs can be tailored to automatically extract features from the images obtained at the shale shaker 402. The computer system flattens the features extracted from the images as a vector. In the illustrated implementation, the abstract features extracted from each frame 408 are concatenated with additional features. Table 1 lists examples of additional features that can be used as input for the models executed by the computer system:

TABLE 1

| Type | Parameter [units] |
|---|---|
| Real-time surface drilling parameters | Stand pipe pressure (SPP) [psi] |
| | Flow rate in, calculated [gpm] |
| | Flow rate out (sensor) [%] |
| | Pump stroke count (STKC) [—] |

TABLE 1-continued

| Type | Parameter [units] |
|---|---|
| | Pump stroke rates (SPMT) [—] |
| | Rate of penetration (ROP), calculated [ft/h] |
| | Revolutions per minute (rpm) |
| | True vertical depth (TVD) [ft] |
| Static data | Mud rheology and properties |
| | Section diameter, formation tops (expected, observed), etc. |
| Additional sensors | Mass sensors, temperature, etc. |

The vector for each frame 408 is provided as input to a sequence model 412. The sequence model 412 includes an output layer that predicts a single value, i.e., the estimated flow of mud in the frame 408. In some implementations, the sequence model 412 is a supervised learning model such as a recurrent neural network (RNN), long short-term memory (LSTM) network, or other regression model. One aspect of the present disclosure uses time series analysis to understand the trends of the flow with respect to time. For this, regression models based on RNN and LSTM are described. They are capable of interpreting the context of a video frame relative to the frames that came before it. However, other implementations can include simple regression models without considering trends (i.e., support vector regression, ridge regression, logistic regression, lasso regression, to name a few).

As previously described, the solids control system of a wellbore drilling assembly 10 can include several shale shakers coupled to a possum belly (see, for example, FIGS. 1 and 2). Since the flow of drilling mud at each shale shaker may be different, for example, due to the opening size of a flow pane, the computer system can implement a model such as the one shown in FIG. 4 for each shale shaker. After calculating the mud flow for each shale shaker, these partial flows are added to determine the total mud flow from the wellbore. In other cases, the model described in reference to FIG. 4 can be implemented only for the discharge zone of the possum belly (in other words without the shale shakers), since the possum belly receives the entirety of the drilling mud that exits the wellbore. Other implementations can include separate models for the possum belly and each of the shale shakers, and the aggregate mud flow at the splash zones of the shale shakers should be equal to the mud flow estimated for the discharge zone of the possum belly.

In implementations that use supervised learning models such as RNN/LSTM to estimate the flow of mud, the model must initially learn the relationships between the image frames 408, drilling parameters, and the mud flow rate at a given time step $t_n$. In order to train the models, a set of N vectors that contain the abstract features extracted from the frames 408, drilling parameters, and other sensor data, represents a sample $S_{tn}$, such that $S_{tn} = \{x_1, x_2, \ldots, x_n\} : y_{tn}$ where $x_i$ represent the abstract and additional features (shown in FIG. 4) and is assigned to the input flow rate that indicates the label y, i.e., the mud flow measured by a surface flow-in rate sensor.

Figure 5:
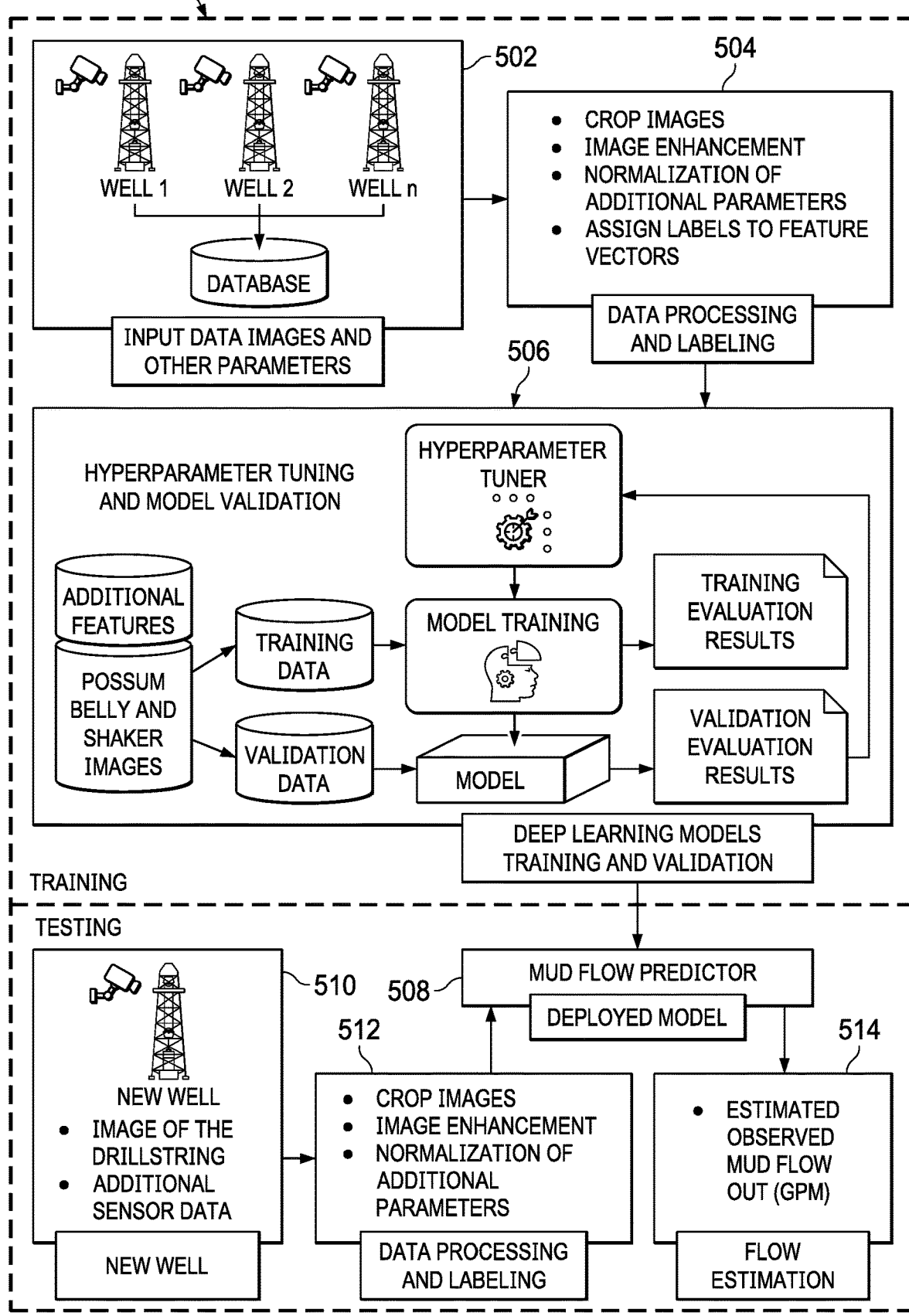
FIG. 5 is an overview of an example process for training and testing a machine learning model, for example, the model shown in FIG. 4

FIG. 5 is an overview of an example process 500 for training and testing a machine learning model, for example, the model shown in FIG. 4. More specifically, a training phase is described in reference to 502-508 of FIG. 5.

At 502, operating parameters that include drilling parameters, the mud weight, or both are received. In some implementations, the drilling parameters include one or more of the parameters listed in Table 1. In some implementations, the mud weight is measured by a mass sensor arranged, for example, below a discharge zone of the possum belly 46. At 504, digital images of mud flow captured at the discharge zone of the possum belly, the splash zones of one or more shale shakers, or both are received. The images can be cropped, enhanced, or augmented in preparation for image processing. The images are processed, for example, using the techniques described above. The feature vectors that result from image processing can be labeled with an input flow rate measured by the surface flow-in rate sensor at the time the image was captured. In some implementations, the data is processed before being labeled. For example, data collected from different wells can include sensors with different ranges of data that arise from different hardware and calibrations. In some implementations, processing and labeling the data can include the use of z-score normalization, mean subtraction, or ranges.

At 506, the labeled data are used to train and validate a machine learning model, for example, a supervised learning model. In some implementations, a data split technique, such as the nested stratified cross-validation technique, is used to train and tune the model parameters of a DL model. In such implementations, the labeled and processed data is split into training data and validation data. In nested cross-validation, inner k-fold cross-validation is used to tune the parameters of the model and is only performed on the training data, while the outer k-fold cross-validation is used to validate the final performance of the model. At 508, the trained and validated machine learning model is deployed to predict the flow rate of mud in an image frame as described previously in reference to FIG. 4.

The trained and validated model can be tested on new wells, as described in 510-514 of FIG. 5. At 510, digital images captured at one or more image capture zones of the new well are collected in the ways previously described. Data from additional sources, such as sensors, can also be received. At 512, the data is processed and labeled. In some implementations, image frames can be enhanced, cropped, or both prior to labeling. In some implementations, processing and labeling the data can include the use of z-score normalization, mean subtraction, or ranges obtained from the training data at 504 to normalize the additional data. In contrast to other implementations, the processed data is not assigned a mud flow-in rate, since the mud flow is the target value that is estimated by the model. At 514, the processed image frames that contain the splash and discharge zones as well as the additional data for the new well or section are fed to a machine learning model to estimate the mud flow observed at the possum belly and one or more shale shakers.

Figure 6A:
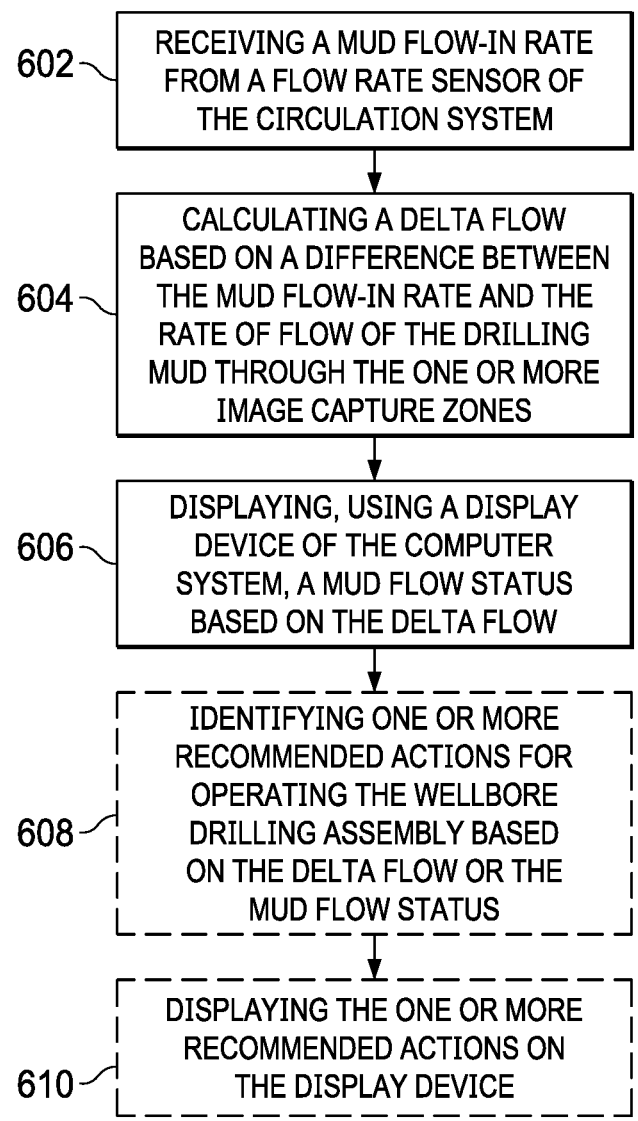
FIG. 6A is a flowchart of an example of a process for evaluating the flow of drilling mud during wellbore drilling operations.

FIG. 6A is a flowchart of an example of a process 600 for evaluating the flow of drilling mud during wellbore drilling operations that follows process 300 described in FIG. 3. At 602, a mud flow-in rate is received from a flow rate sensor of the circulation system. The mud flow-in rate indicates, for example, the flow of drilling mud into the wellbore drilling assembly in gallons per minute. In normal drilling operations, the mud flow-in rate should be substantially equal to the rate at which mud flows out of the wellbore. Thus, at 604, a delta flow that reflects a difference between the mud flow-in rate and the rate of flow of the drilling mud through the one or more image capture zones is calculated. In some implementations, delta flow is calculated in gallons per minute.

At 606, a display device of the on-site computer system is used to display a mud flow status based on the delta flow. In some cases, a mud flow status is determined by comparing the delta flow to a pre-determined threshold value. An estimated mud flow greater than the measured mud flow-in rate can indicate an increased likelihood of kicks or a blowout. An estimated mud flow less than the measured mud flow-in rate can indicate a loss of circulation. When the estimated and measured mud flows substantially differ, a severity of the discrepancy can also be estimated and displayed. For example, if the estimated mud flow out is less than the measured mud flow in, a difference or a ratio of the estimated flow and the measured flow in can be calculated and compared to empirical values or threshold values to indicate a low, severe, or total loss of mud circulation. Alternatively, if the estimated mud flow out is greater than the measured mud flow in, a difference can be calculated to determine the total amount of gain mud (e.g., in gallons per minute).

Figure 6B:
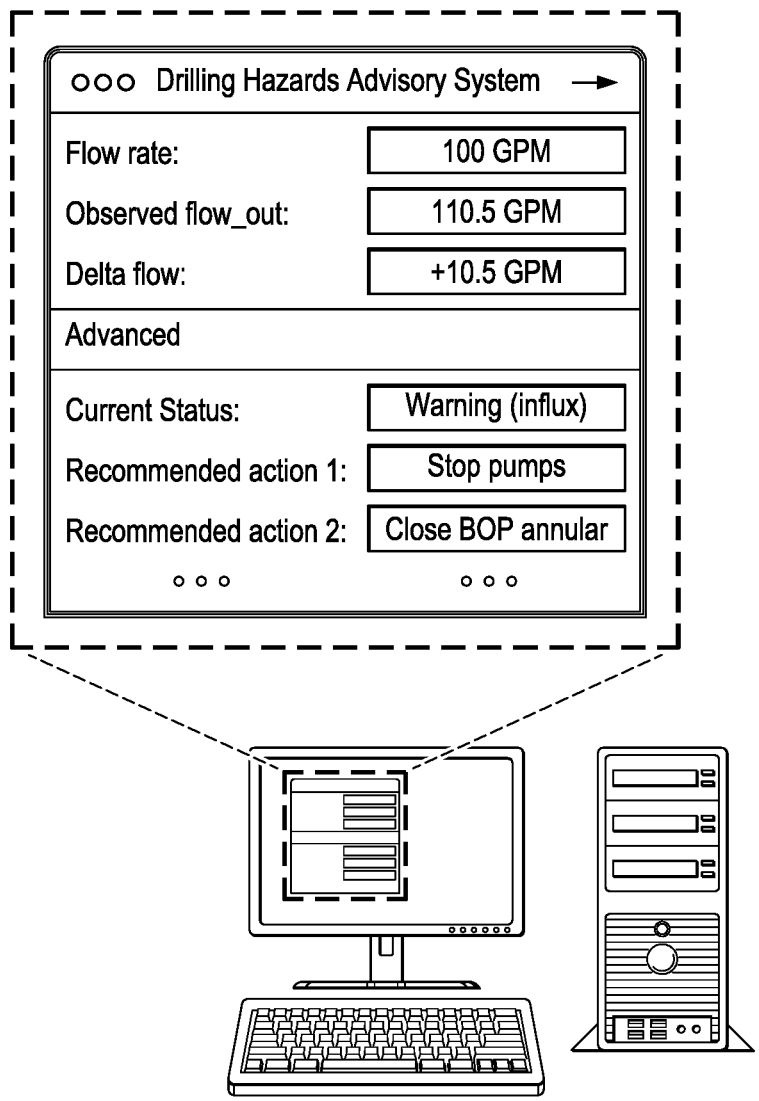
FIG. 6B is a schematic diagram of a mud flow recommendation system.

Optionally, at 608, one or more recommended actions for operating the wellbore drilling assembly based on the delta flow or the mud flow status are identified. For example, the severity can be compared to historical data and logs from offset wells. In some cases, the total amount of gain mud can be used to look up a recommended mud weight to kill the well. The amount of gain mud can also be used to look up recommended actions, such as stopping circulation, closing the blowout preventer (BOP) annulus or ram to prevent a blowout. In the event of mud losses or lost circulation, the calculated severity can be used to infer whether the cause of the lost circulation is natural or induced. In some implementations, a lost circulation material can be recommended based on the historical data from the offset wells. Such data can include the depth of the wellbore and the lithology in the open hole, to name a few examples, and the type of lost circulation material and amount used for successfully stopping losses. Optionally, at 610, the one or more recommended actions are displayed on the display device alongside the mud flow status, as shown in FIG. 6B. In some implementations, a value indicating delta flow can also be displayed. Thus, the process 600 can automatically identify the amount of mud losses or gains and provide recommendations to the crew in real-time, based on the historical data and logs from the offset wells.

Generally, the implementations in this disclosure include image processing of image data that has been captured in continuous recording. Continuous recording can capture trends of the mud flow over time. However, image can also be processed in snapshot mode, for example, 10 frames per minute. The timing can be adapted to the speed of the processers and the transport time of the mud and solids across the image capturing zone to avoid double counting. Further, the image processing techniques of the present disclosure can also be used to detect characteristics of the drilling mud such as its color or temperature. Applications of such an implementation can be used to determine a circulation time necessary to clean a wellbore, i.e., the number of bottom ups. In such cases, high viscosity or sweep pills are pumped into the well to carry out the drill cuttings. The system and techniques described in this disclosure can also be used to derive a model able to recognize a dye or consistency contained in the sweep/high viscosity pill in order to automatically detect the pill at the shale shakers or possum belly.

The above description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure.

Thus, the present disclosure is not intended to be limited to the described or illustrated implementations, but is to be accorded the widest scope consistent with the principles and features disclosed in this disclosure.

What is claimed is:

1. A method for monitoring the flow of drilling mud from a wellbore, comprising:
  capturing, using a digital imaging device, images of drilling mud at a surface of the wellbore as the drilling mud flows through one or more image capture zones of a circulation system that circulates drilling mud through the wellbore and a wellbore drilling assembly;
  receiving, by one or more processors of a computer system operatively coupled to the digital imaging device, the images captured by the digital imaging device; and
  processing, by the one or more processors, the images captured by the digital imaging device to determine a rate of flow of the drilling mud through the one or more image capture zones, wherein processing the images comprises:
    deploying a machine learning model to extract abstract features from the images captured by the digital imaging device, wherein the machine learning model comprises a convolutional neural network (CNN) model, and
    determining the rate of flow of the drilling mud through the one or more image capture zones by processing, using the CNN, the abstract features and additional features that comprise one or more of drilling parameters of the wellbore drilling assembly, properties of the drilling mud, and the weight of drilling mud measured in the one or more image capture zones using one or more mass sensors.

2. The method of claim 1, further comprising:
  receiving a mud flow-in rate from a flow rate sensor of the circulation system;
  calculating a delta flow based on a difference between the mud flow-in rate and the rate of flow of the drilling mud through the one or more image capture zones; and
  displaying, using a display device of the computer system, a mud flow status based on the delta flow.

3. The method of claim 2, further comprising:
  identifying one or more recommended actions for operating the wellbore drilling assembly based on the delta flow or the mud flow status; and
  displaying the one or more recommended actions on the display device.

4. The method of claim 2, wherein the one or more image capture zones comprise a discharge zone where a flow-out line connects to a possum belly, the possum belly being configured to receive drilling mud from the flow-out line.

5. The method of claim 4, wherein the circulation system comprises one or more shaker assemblies, each comprising a splash zone configured to receive drilling mud from the possum belly, wherein the one or more image capture zones comprise the splash zone of each of the one or more shaker assemblies.

6. The method of claim 5, wherein the one or more shaker assemblies comprises a plurality of shaker assemblies, wherein the method further comprises:
  determining a partial flow rate of drilling mud through the splash zone of each of the plurality of shaker assemblies; and
  combining the partial flow rates to obtain the rate of flow of the drilling mud.

7. The method of claim 1, wherein determining the rate of flow of the drilling mud through the one or more image capture zones by processing, using the CNN comprises:
  receiving the additional features;
  concatenating the abstract features extracted by the CNN and the additional features; and
  feeding the concatenated features as input to a regression model to determine the rate of flow of the drilling mud through the one or more image capture zones.

8. A system for monitoring the flow of drilling mud from a wellbore, comprising:
  a digital imaging device configured to capture images of drilling mud at a surface of the wellbore as the drilling mud flows through one or more image capture zones of a circulation system configured to circulate drilling mud through the wellbore and a wellbore drilling assembly;
  a computer system operatively coupled to the digital imaging device, the computer system comprising one or more processors and a computer-readable medium storing instructions executable by the one or more processors to perform operations comprising:
    receiving the images captured by the digital imaging device; and
    processing, by the one or more processors, the images captured by the digital imaging device to determine a rate of flow of the drilling mud through the one or more image capture zones, wherein processing the images comprises deploying a convolutional neural network (CNN) model that determines the rate of flow of the drilling mud through the one or more image capture zones using abstract features extracted from the images captured by the digital imaging device and additional features that comprise one or more of drilling parameters of the wellbore drilling assembly, properties of the drilling mud, and the weight of drilling mud measured in the one or more image capture zones.

9. The system of claim 8, further comprising a flow rate sensor configured to measure a mud flow-in rate of the drilling mud through the wellbore drilling assembly and into the wellbore,
  wherein the computer system comprises a display device and is configured to perform operations comprising:
    receiving the mud flow-in rate from the flow rate sensor;
    calculating a delta flow based on a difference between the mud flow-in rate and the rate of flow of the drilling mud through the one or more image capture zones;
    identifying a mud flow status based on the delta flow;
    identifying one or more recommended actions for operating the wellbore drilling assembly based on the delta flow or the mud flow status; and
    displaying the mud flow status and the one or more recommended actions on the display device.

10. The system of claim 8, further comprising a possum belly configured to receive drilling mud from a flow-out line of the circulation system, wherein the one or more image capture zones comprise a discharge zone where the flow-out line connects to the possum belly.

11. The system of claim 10, wherein the digital imaging device comprises a camera mounted to or adjacent to the possum belly and oriented to face the discharge zone of the possum belly.

12. The system of claim 10, further comprising one or more shaker assemblies, wherein each of the one or more shaker assemblies comprises a splash zone configured to receive drilling mud from the possum belly, wherein the one or more image capture zones comprise the splash zone of each of the one or more shaker assemblies.

13. The system of claim 12, wherein each of the one or more shaker assemblies comprises a flow pane with an adjustable opening through which drilling mud flows from the possum belly into the splash zone, wherein the one or more image capture zones comprise the flow pane of each of the one or more shaker assemblies.

14. The system of claim 13, wherein the digital imaging device comprises a camera mounted to or adjacent to each of the one or more shaker assemblies, wherein each camera is oriented to face the splash zone and flow pane of the one or more shaker assemblies.

15. The system of claim 12, wherein the digital imaging device comprises a camera mounted above and oriented to face the possum belly and the one or more shaker assemblies, wherein the camera comprises a field of view that comprises the discharge zone of the possum belly and the splash zone of each of the one or more shaker assemblies.

16. The system of claim 8, wherein deploying the CNN model comprises:
   deploying the CNN model to extract the abstract features from the images captured by the digital imaging device;
   receiving the additional features that comprise the one or more of drilling parameters of the wellbore drilling assembly, the properties of the drilling mud, and the weight of drilling mud measured in the one or more image capture zones from one or more mass sensors;
   concatenating the abstract features extracted by the CNN and the additional features; and
   feeding the concatenated features as input to a regression model to determine the rate of flow of the drilling mud through the one or more image capture zones.

17. A non-transitory computer-readable medium storing instructions executable by one or more processors to perform operations comprising:
   receiving images of drilling mud at a surface of a wellbore captured by a digital imaging device as the drilling mud flows through one or more image capture zones of a circulation system configured to circulate drilling mud through the wellbore and a wellbore drilling assembly;
   deploying a convolutional neural network (CNN) model to extract abstract features from the images captured by the digital imaging device;
   receiving additional features that comprise one or more of drilling parameters of the wellbore drilling assembly, properties of the drilling mud, and the weight of drilling mud measured in the one or more image capture zones using one or more mass sensors;
   concatenating the abstract features extracted by the CNN and the additional features; and
   feeding the concatenated features as input to a regression model to determine the rate of flow of the drilling mud through the one or more image capture zones; and
   processing the images captured by the digital imaging device to determine a rate of flow of the drilling mud through the one or more image capture zones.

18. The medium of claim 17, the operations further comprising:
   receiving a mud flow-in rate from a flow rate sensor of the circulation system;
   calculating a delta flow based on a difference between the mud flow-in rate and the rate of flow of the drilling mud through the one or more image capture zones;
   identifying a mud flow status based on the delta flow;
   identifying one or more recommended actions for operating the wellbore drilling assembly based on the delta flow or the mud flow status; and
   displaying the mud flow status and the one or more recommended actions on the display device.

* * * * *